United States Patent
Boghossian et al.

(10) Patent No.: US 10,872,134 B2
(45) Date of Patent: Dec. 22, 2020

(54) METHOD AND SYSTEM FOR IDENTIFYING PRE-IDENTIFIED OR PRE-SELECTED GROUPS OF INDIVIDUALS FOR TRANSPORTATION

(71) Applicant: RideMates, Inc., Glendale, CA (US)

(72) Inventors: Zarik Boghossian, Glendale, CA (US); Noel Gharibian, Glendale, CA (US)

(73) Assignee: Ridemites Group, Inc., Glendale, CA (US)

( * ) Notice: Subject to any disclaimer, the term of this patent is extended or adjusted under 35 U.S.C. 154(b) by 218 days.

(21) Appl. No.: 16/057,445

(22) Filed: Aug. 7, 2018

(65) Prior Publication Data

US 2019/0171798 A1     Jun. 6, 2019

Related U.S. Application Data

(60) Provisional application No. 62/542,249, filed on Aug. 7, 2017, provisional application No. 62/545,344, filed on Aug. 14, 2017.

(51) Int. Cl.
| | |
|---|---|
| *G06F 21/00* | (2013.01) |
| *G06F 21/31* | (2013.01) |
| *G06Q 50/30* | (2012.01) |
| *G06F 21/45* | (2013.01) |

(52) U.S. Cl.
CPC .............. *G06F 21/31* (2013.01); *G06F 21/45* (2013.01); *G06Q 50/30* (2013.01)

(58) Field of Classification Search
CPC .......... G06F 21/31; G06F 21/45; G06Q 50/30
See application file for complete search history.

(56) References Cited

U.S. PATENT DOCUMENTS

| | | | | |
|---|---|---|---|---|
| 10,563,998 B1* | 2/2020 | Rivera | ............... | G01C 21/3682 |
| 2015/0227890 A1* | 8/2015 | Bednarek | ........... | G06Q 30/0635 |
| | | | | 705/26.81 |
| 2015/0228004 A1* | 8/2015 | Bednarek | ......... | G06Q 10/08355 |
| | | | | 705/26.8 |
| 2017/0138749 A1* | 5/2017 | Pan | ..................... | G01C 21/3438 |
| 2017/0352125 A1* | 12/2017 | Dicker | ............... | G06Q 10/1097 |
| 2018/0091604 A1* | 3/2018 | Yamashita | ............. | G06Q 50/30 |

(Continued)

*Primary Examiner* — Mahfuzur Rahman

(57) ABSTRACT

A computer-implemented method for matching transportation providers with transportation requesters includes receiving, from a requester computing device, a transportation request to transport a ride requester and the trusted transportation provider being an individual who has an established verified relationship with the ride requester and retrieving computing device transmission parameters for one or more trusted transportation providers from a database on a computing device. The computer-implemented includes communicating the transportation request based, at least in part, on the retrieved computing device transmission parameters and receiving, from the one or more trusted provider computing devices, one or more acceptances of the transportation request. The computer-implemented includes identifying a selected trusted transportation provider, from the one or more acceptances of the transportation request by the one or more trusted provider computing devices and communicating the identification as the selected trusted transportation provider, to a selected trusted transportation computing device.

17 Claims, 41 Drawing Sheets

(56) References Cited

U.S. PATENT DOCUMENTS

2018/0137593 A1* 5/2018 Djuric .................... G06Q 50/30
2018/0342033 A1* 11/2018 Kislovskiy ............. G06Q 50/30
2019/0050880 A1* 2/2019 Paul ....................... G06Q 10/02

* cited by examiner

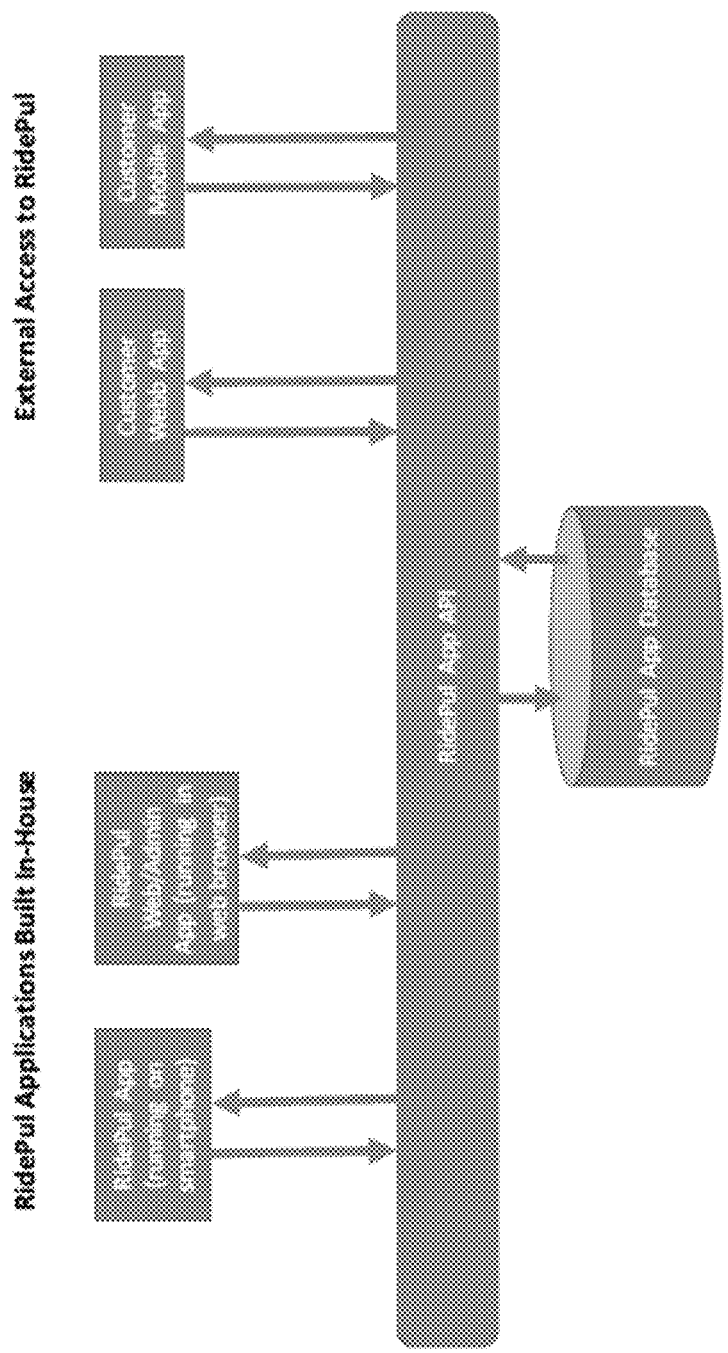

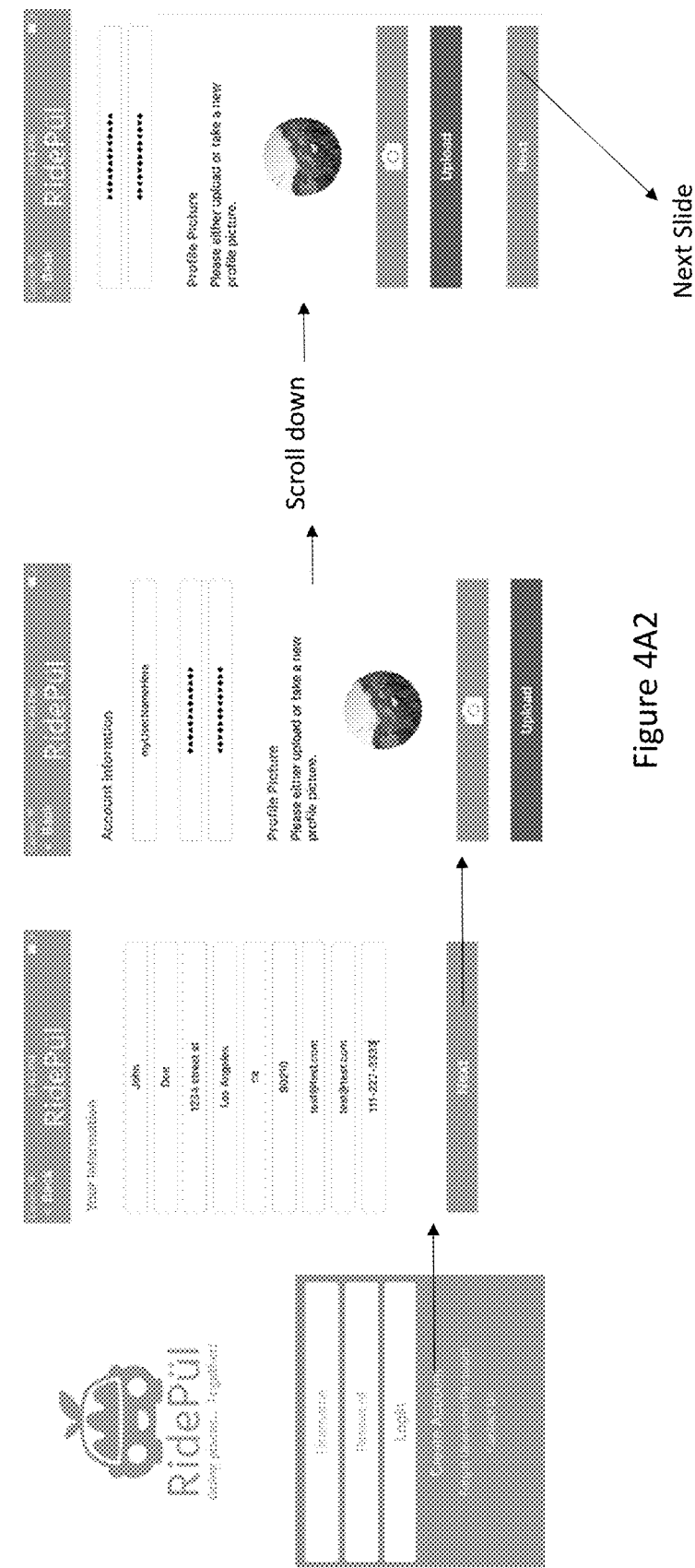
Figure 4A2

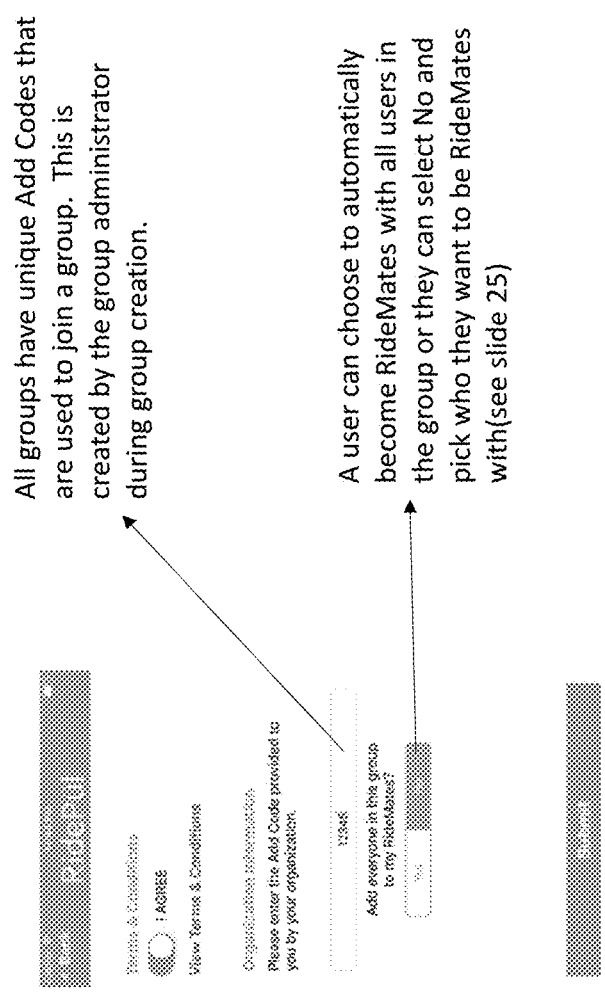
Figure 4B2

Requesting to be picked up:
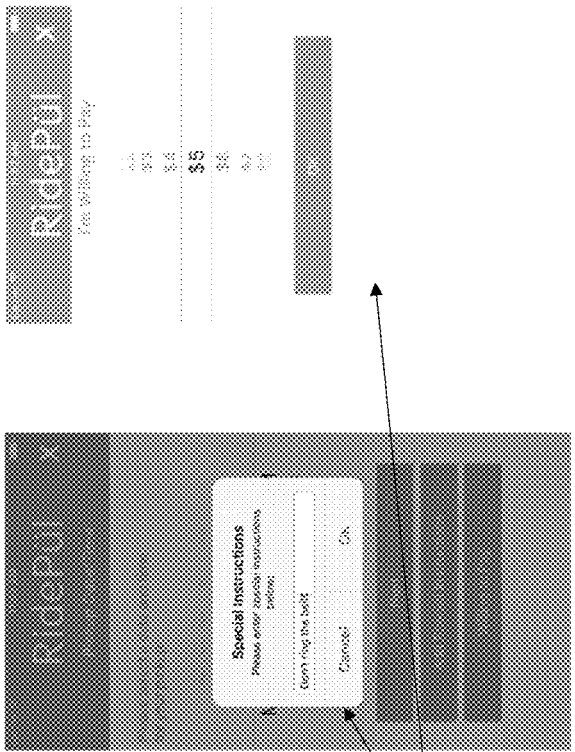
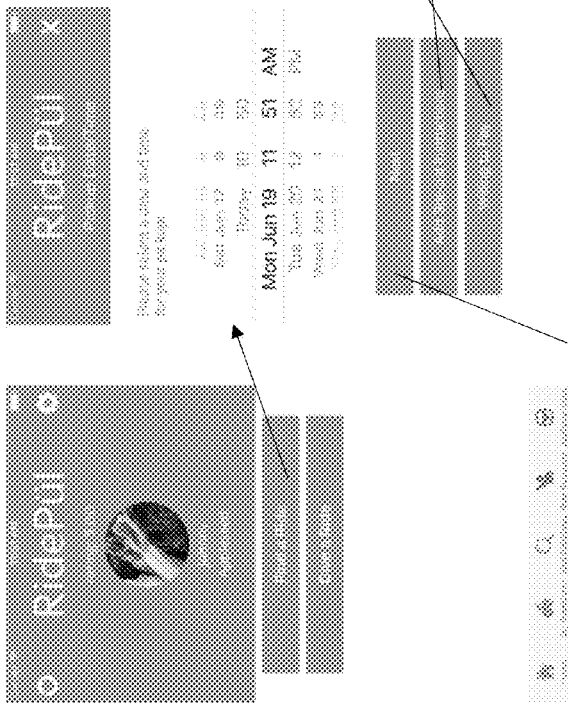
Next Slide
Figure 4C

Requesting to be picked up (continued)
User selects a group they are a member of to send the request to. Depending on the group (static group or dynamic group), user will be presented either a list of locations, or a map.
Dynamic Group:
Figure 7B Requesting to be picked up (continued)
Creating a request to a static group only differs in the way the pickup and drop off locations are selected. The resulting request is the same as for a dynamic group.

Static Group:

When the user is dropped off, the app returns to the home screen

Figure 11B

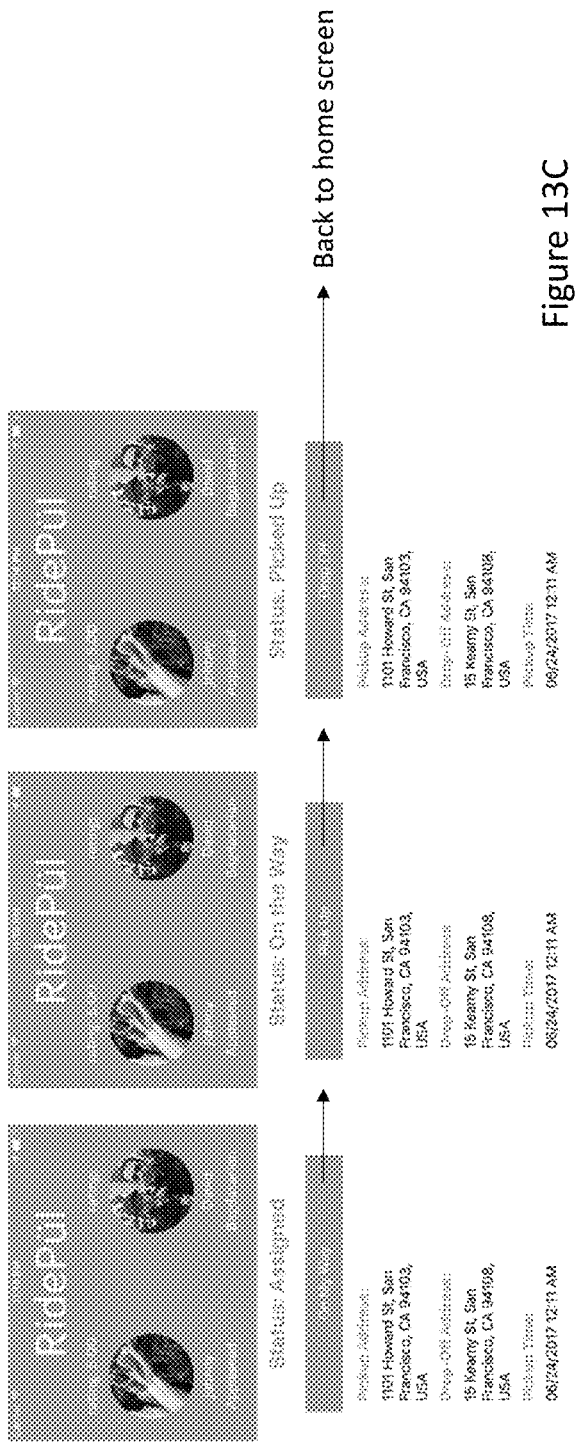

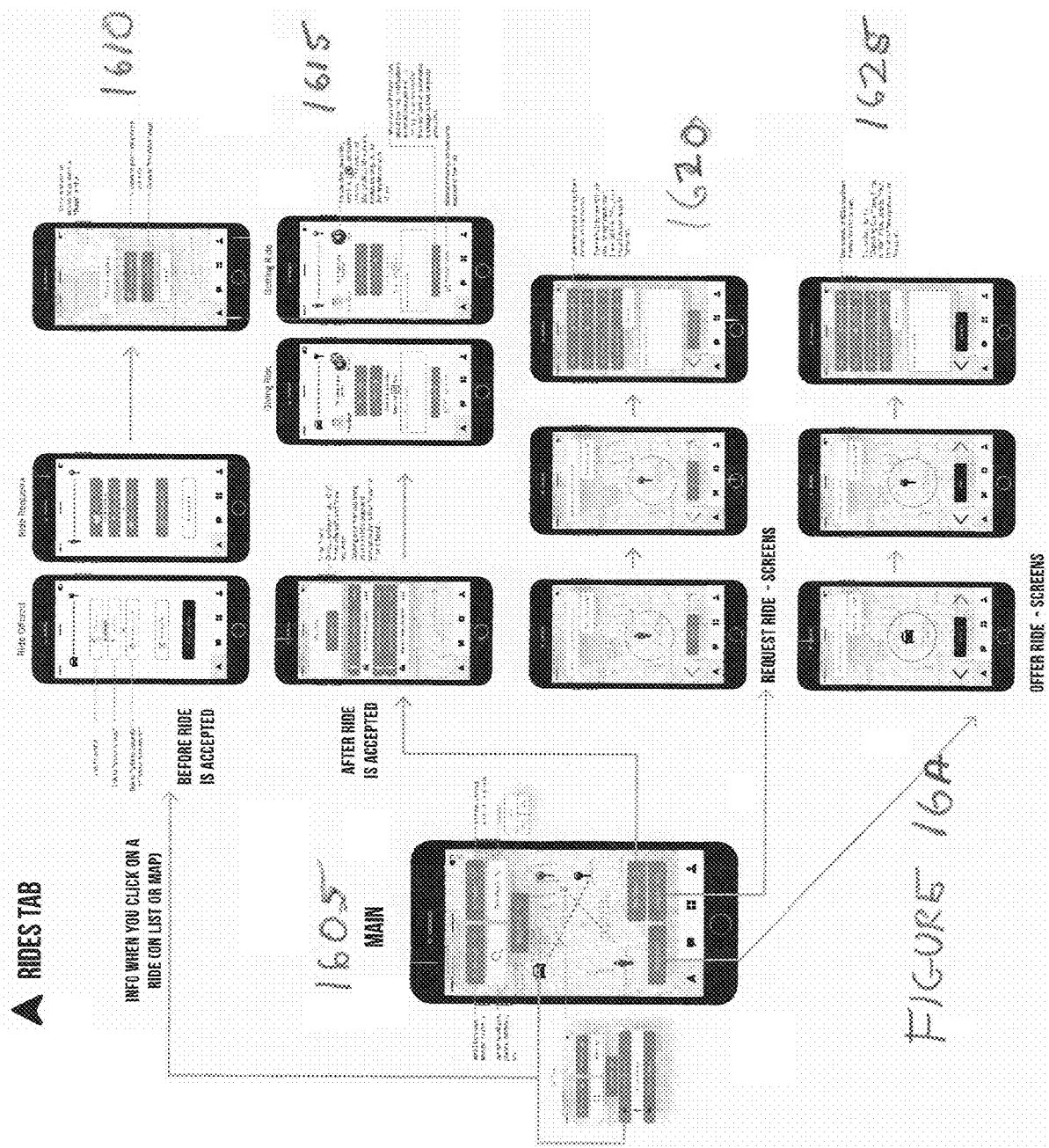

METHOD AND SYSTEM FOR IDENTIFYING PRE-IDENTIFIED OR PRE-SELECTED GROUPS OF INDIVIDUALS FOR TRANSPORTATION

RELATED APPLICATIONS

This application claims priority to U.S. provisional patent application Ser. No. 62/542,249, filed Aug. 7, 2017, entitled "Method and System for Identifying Pre-Identified or Pre-Selected Groups of Individuals for Transportation" and U.S. provisional patent application Ser. No. 62/545,344, filed Aug. 14, 2017, entitled "Method and System for Identifying Pre-Identified or Pre-Selected Groups of Individuals for Transportation," the disclosures of which are hereby incorporated by reference.

BACKGROUND

1. Field

The subject matter disclosed herein relates to a method, apparatus, application and/or system for enabling transportation to be arranged between groups of users, and more particularly for enabling transportation to be arranged between groups of individuals who have been pre-identified as being trustworthy by other users or pre-selected as having something in common with other individuals. The groups of individuals who have been pre-identified as being trustworthy may be referred to as RIDEMATES™.

2. Information/Background of Information

Traffic congestion in metropolitan areas and suburbs is becoming worse every day. The price of gas is very high and many individuals are struggling to afford transportation costs. In addition, parking costs are continuing to rise and many times are more expensive than the cost of fuel. In addition, companies, as well as individuals, are more receptive to becoming greener and having a smaller carbon footprint (e.g., promoting carpooling and rideshares). Conventional transportation management systems employed for taxi and limousine services typically utilize onboard metering devices, radios and cell phones to dispatch drivers and monitor fares. Problems exist when individuals who are unknown or not trusted by passengers are picking up and transporting passengers to desired destinations. Such systems are not communicative to individuals, do not provide status of passengers en route, and lack interactivity. Modern services have resolved those shortcomings with up-to-date status of the services provided, as well as up-front pricing for the service, and in addition providing a more modern and realistic approach to arranging transportation services by incorporating smart phone technology.

However, there exists a need, for a transportation service that allows users to be able to arrange transportation with trusted individuals without going through the hassle of contacting individuals individually along with the time spent arranging the rides. A need for a more efficient and finite system for arranging transportation with trusted individuals would be very desirable and highly appreciated. This does not exist in the current marketplace whether regular practice or by other online transportation providers.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIGS. 1A, 1B and 1C illustrate a block diagram and dataflow diagram of system and process associated with a transportation transaction utilizing transportation requesters and transportation providers according to embodiments;

FIG. 4A2 illustrates another registration process according to embodiments;

FIG. 4B2 illustrates that by selection of a button and/or icon, a user can choose to automatically become RideMates with all users to the group;

FIG. 4C illustrates a trusted transportation request selection group according to an embodiment;

FIG. 7B illustrates an alternate embodiment where a user selects a group (e.g., a test group) in a RIDEPUL™ software application;

FIG. 11B illustrates screen shots of a transportation provider accepting a transportation request from a transportation provider;

FIG. 13C illustrates status screens in a process of a transportation provider generating a transportation offer and one of a selected group RIDEMATES accepting the offer;

FIG. 16A illustrates screen shots of a trusted transportation requesting and providing (e.g., RIDEPUL) system according to embodiments.

Figure 1A:
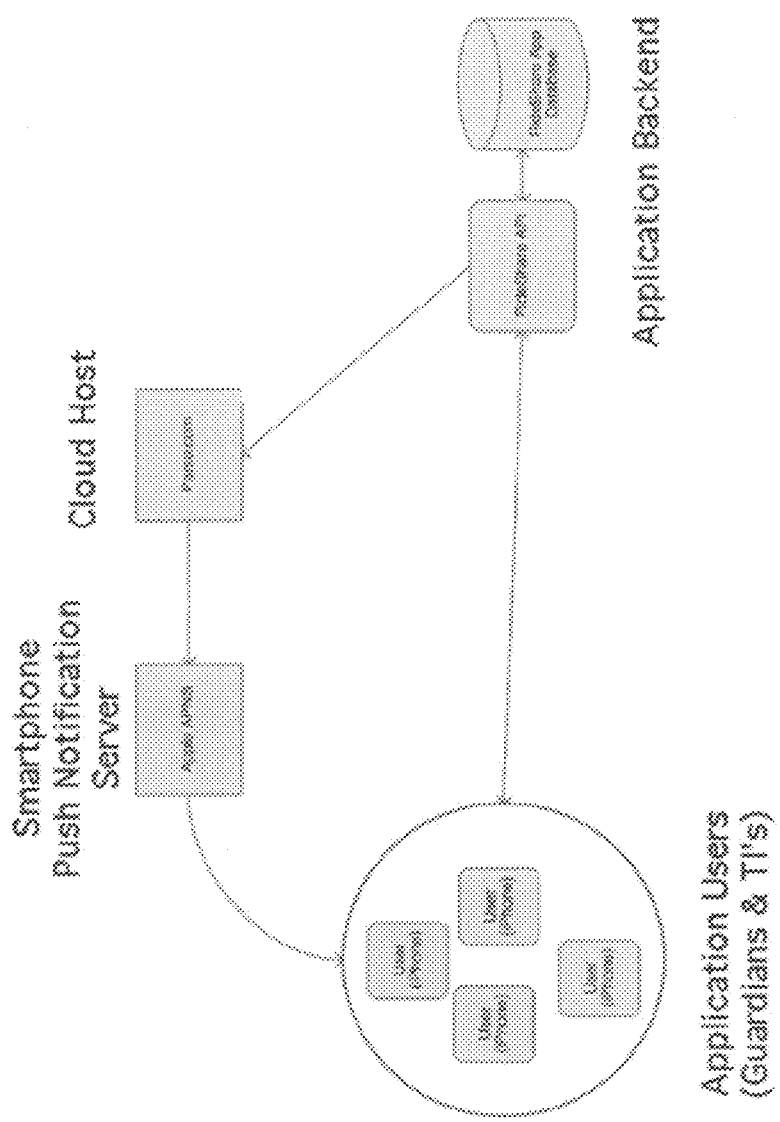

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A "mobile communications device" may include a processor or processors capable of sending or receiving signals, such as via a wired or a wireless network, and capable of running application software or "apps". In an embodiment, a mobile communications device may communicate with a server computing device. A mobile communications device may, for example, comprise a device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features of the forgoing devices.

In embodiments, a mobile communications device may vary in terms of capabilities or features. The mobile communications device may include standard components such as a CPU, power supply, a memory or memory resources, ROM, BIOS, network interface(s), audio interface, display, keyboard/keypad/pointing device, I/O interface, interconnected via buses, and/or traces or circuitry. In an embodiment, a mobile communications device may include an optical device (e.g., a camera, a scanner, or an optical reader device) to capture and/or scan links, codes, images, and the like. Claimed subject matter is intended to cover a wide range of potential variations. For example, the keyboard/keypad/pointing device/touchscreen of a cell phone may include input of limited functionality, such as a monochrome liquid crystal display (LCD) for displaying text. In contrast, however, as another example, a web-enabled mobile communications device may include one or more physical or virtual keyboards, mass storage, or a display with a high degree of functionality, such as a touch-sensitive color 2D or 3D display, for example. The memory can include Random Access Memory including an area for data storage.

A mobile communications device may include or may execute a variety of operating systems, including a personal computer operating system, such as a Windows, iOS or Linux, or a mobile operating system, such as iOS, Android, or Windows Mobile, or the like. A mobile communications device may include or may execute a variety of possible applications, such as a client software application enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A mobile communications device may also include or execute an application to communicate content, such as, for example, textual content, multimedia content, or the like. A mobile communications device may also include or execute an application to perform a variety of possible tasks, such as browsing, searching, playing various forms of content, including locally stored or streamed content. The foregoing is provided to illustrate that claimed subject matter is intended to include a wide range of possible features or capabilities. The mobile communications device may also include imaging software applications for capturing, processing, modifying and transmitting image files utilizing the optical device (e.g., camera, scanner, optical reader) within the mobile computing device.

For the purposes of this disclosure a computer readable medium stores computer data, which data can include computer program code that is executable by a computer, in machine- and/or computer-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), cloud-based servers, or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As an example, a router may provide a link between otherwise separate and independent LANs.

A "computing device" may be capable of sending or receiving signals, such as via a wired or wireless network, or may be capable of processing or storing signals, such as in memory as physical memory states, and may, therefore, operate as a server. A "server" or "server computing device" may be capable of same features and functions of computing device. For the purposes of this disclosure the term "server" should be understood to refer to a service point which provides processing, database, and communication facilities. By way of example, and not limitation, the term "server" can refer to a single, physical processor with associated communications, and data storage and database facilities, or it can refer to a networked or clustered complex of processors and associated network and storage devices, as well as operating software and one or more database systems and applications software which support the services provided by the server. The term "server" may either be a physical or virtual server. In embodiments, a "server" may be housed or hosted by a third party and may only occupy a portion (e.g., a private portion) of a computing device.

A clear understanding of the key features of the above-summarized invention may be had by reference to the appended drawings, which illustrate the method and system of the invention, although it will be understood that such drawings depict preferred embodiments of the invention and, therefore, are not to be considered as limiting its scope with regard to other embodiments that the invention is capable of contemplating.

In embodiments, a computing device may be a mobile device (e.g., phone), mobile computing device, mobile communications device, tablet, laptop computer, desktop computer, network computer and in some embodiments, the terms may be utilized interchangeably. In embodiments, the computing device may be a server, router, switch and those terms may also be utilized interchangeably.

As used herein, a "cloud" is used in an art-recognized manner and can refer to a collection of centrally managed resources such as networked hardware and/or software systems and combinations thereof provided and maintained by an entity, wherein the collection of resources can be accessed by a user via wired or wireless access to a network that may be public or private, such as, for example, a global network such as the Internet. Such centralized management and provisioning of resources can provide for dynamic and on-demand provisioning of computing and/or storage to match the needs of a particular application. The cloud may include a plurality of servers, general or special purpose computers, as well as other hardware such as storage devices. The resources can include data storage services, database services, application hosting services, payment processing services, and many other information technological services that are conventionally associated with personal computers or local and remote servers. Moreover, in one aspect, the resources can be maintained within any number of distributed servers and/or devices as discussed in more detail below. Thus, the present disclosure discusses a system that performs data storage and application hosting operations within a cloud computing environment in order for a user to manage his/her personal information from a central online location.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever, for example, a component, subroutine, or module, of the present invention is implemented as software, the component, subroutine, and/or module may be implemented as a script, as a stand-alone program, as part of a larger program, as a plurality of separate scripts and/or programs, as a statically or dynamically linked library, as a kernel loadable module, as a device driver, and/or in every and any other way known now or in the future to those of skill in the art of computer programming.

In embodiments, one or more embodiments provide that methods, techniques and action performed by a computing device are performed programmatically, or as a computer-implemented method. Methods and techniques may be performed through the use of code, or computer-executable instructions. Steps of methods of processes may be implemented automatically or may not be automatic. Portions, modules, agents, managers, components, functions, procedures, actions, layers, features, attributes, and/or methodologies may exist on a hardware component independently of other such software constructs.

Alternatively, such software constructs may be shared elements or other software constructs.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Examples of computer-readable mediums include portable storage mediums (e.g., CD and/or DVD), flash memory, and various forms of magnetic memory.

Systems, methods, apparatuses and software apps/applications are described and/or presented for enabling arrangement of transportation for individuals who belong to pre-assigned and/or pre-configured groups. In embodiments, individuals in the pre-assigned and/or pre-configured groups may be trusted individuals. As illustrative examples, college students in a specific dormitory or a cluster of dormitories may create and/or join a group for a dorm (or cluster of dormitories). In this illustrative example, students who have cars and live in dorms may provide and/or give rides to students with no cars who live in the dorm, cluster of dormitories, or a nearby student housing. In embodiments, these individuals may create one or more groups of trusted transportation providers. As another illustrative example, individuals who work at the Glendale Galleria (or other retail shopping space) may join a Glendale Galleria group and share and/or offer rides to individuals who work at the Glendale Galleria. As a further illustrative example, a city (e.g., Valencia, Calif.) may create a group for employees who work at various city facilities. In embodiments, RIDEPUL app software is a platform or a software platform that enables individuals to find groups, join groups, and/or select other individuals they would like to carpool with. The RIDEPUL app software, via an automated interface, may send or communicate ride request to only selected individuals (RIDEMATES or trusted individuals) that an individual has selected from a group. In embodiments, the RIDEPUL app or application software may allow RIDEMATES or trusted individuals to be added or deleted at any time (similar to other social media platforms such as Facebook) and be authenticated and/or verified at any time. Rides or transportation requests may be requested for a certain date and time either on the same day or in the future (e.g., recurring events). In embodiments, rides or transportation transactions may be monetized to provide incentive for those who provide the ride since the RIDEPUL™ app or application software keeps track of an individual's number of rides requested and/or provided. The RIDEPUL™ app or application software may allow both individuals and/or large institutions to create their own groups and allows individuals to utilize a RIDEPUL™ app or software application with minimal setup. In embodiments including institutions, an IT department may sign up employees and through an Application Programming Interface (API), allow employees to interface with RIDEPUL™ database and RIDEPUL™ application. Illustratively, individuals may search a RIDEPUL™ database via a RIDEPUL™ API to find group(s) individuals want to join or request that an administrator create a group that is already available. In embodiments, once a group is created, a group identifier and/or code may be shared by the individual to allow others to join group. In embodiments, any individual transporting others may need to be authenticated and/or verified.

In embodiments, individuals may sign-up and/or join RIDEPUL™ transportation services via a variety of measures. In embodiments, an individual may download a RIDEPUL™ software application onto an individual's mobile computing device and initiate the RIDEPUL™ software application. In embodiments, an individual may log into a web interface and communicate with a RIDEPUL™ server (e.g., a smartphone/mobile communications device push notification server or a cloud-based push notification server) in order to initiate a RIDEPUL™ software application. In another embodiment, an institution IT department (e.g., a city IT department, a company IT department, etc.) may establish a process to connect to RIDEPUL™'s Application Programming Interface (API). Individuals in an institution may register with the RIDEPUL™ database through or via the RIDEPUL™ API. In an exemplary process, an individual (via a smartphone interface, a web interface, or a custom interface) may communicate with a RIDEPUL™ server and/or database (via the RIDEPUL™ API) and communicate personal and/or public information to create an individual profile. In embodiments, an individual profile may be stored in a memory of a RIDEPUL™ server and/or RIDEPUL™ database (via the RIDEPUL™ API). In embodiments, an individual profile may also be stored in a memory of a mobile communication device executing a RIDEPUL™ software application. In embodiments, a RIDEPUL™ server and/or database may vet or evaluate or authenticate an individual to verify the individual is a user that is acceptable to utilize a RIDEPUL™ system (e.g., does not have a criminal record, a bad driving record and/or a DUI).

In embodiments, an individual may join existing groups and/or create an existing groups. In embodiments, an individual may enter a code, a group identifier or other identifier to select a desired group an individual may elect or desire to join. In embodiments, an individual's wireless communication device or portable computing device may communicate with a RIDEPUL™ server and/or database (via the RIDEPUL™ API) to retrieve corresponding group information and communicate this information regarding group (or groups) to an individual's wireless communication device. In embodiments, a RIDEPUL™ software application executing on a wireless communication device or mobile computing device may display a selected and/or retrieved group. In embodiments, an individual may submit a keyword and/or other identifier, which is communicated from the individual's wireless communication device to a RIDEPUL™ server and/or database (via the RIDEPUL™ API). In embodiments, a RIDEPUL™ server and/or database may retrieve groups corresponding to entered keywords and/or identifiers and communicate retrieved selected groups to an individual's wireless communication device. In embodiments, a RIDEPUL™ application on a mobile communication device or mobile computing device may present or display a list of retrieved selected groups. In embodiments, a user may select one or more groups from which to selected trusted transportation providers. For example, an individual who works in the Glendale Galleria may select a Glendale Galleria Group and/or a Glendale group from which to selected trusted transportation providers.

In embodiments, an individual may enter a transportation request for himself or herself or a related individual (e.g., family member, parent, child, business associate). In embodiments, a related individual may be referred to as an affiliate. In embodiments, an individual may initiate a RIDEPUL™ software application to initiate a transportation request. In embodiments, an individual may be referred to as a transportation requester. In embodiments, a transportation requester may initiate a transportation request by selecting one or more of a groups to which the transportation requester belongs (or may join additional groups). For example, a RIDEPUL™ software application on a mobile communications device may present a list of members of a selected groups. In embodiments, members of selected groups may be referred to as transportation providers and/or trusted transportation providers (e.g., RIDEMATES™). In embodiments, a requester may select some or all of listed trusted transportation providers (e.g., in other words, a transportation requester may only select certain transportation providers presented in a group's list of transportation providers). For example, a transportation requester may select two trusted transportation providers of six listed transportation providers from a selected group. In embodiments, a transportation requester may be traveling or going somewhere and may offer a ride to other members of selected groups. In embodiments, a transportation provider may be referred to a transportation offeror in this situation and may generate a transportation offer.

In embodiments, if a requester selects a group of existing transportation providers, the group of transportation providers may have or be assigned a pre-existing address. For example, if the group is a Glendale Galleria group, then the address of the Glendale Galleria may be pre-assigned to the group either as a destination address and/or as a pickup address. In embodiments, if a requester selects a group of existing transportation providers, a group of transportation providers may not have assigned a pre-existing address and a user may enter an address through a variety of ways, including but not limited to text entry, spoken words, and/or dragging an indicator on an electronic map.

In embodiments, a transportation requester may enter details of a transportation request. In embodiments, an individual may enter a date and time of the transportation request. In embodiments, an individual may select a pickup address (or identify a pickup address) and a destination address (or identify a destination address on a map). In embodiments, a transportation request (or RIDEPUL™ individual requester) may select from pre-defined static pickup addresses and/or predefined static destination addresses. In embodiments, a populated transportation request (e.g., comprising date, time, pickup address, and/or destination address) may be transmitted from a requester's mobile communication device to a RIDEPUL™ server and/or database (via the RIDEPUL™) API and to a group of trusted transportation provider's mobile communication devices. For example, if a transportation requester selected a group of trusted transportation providers, a populated transportation request may be transmitted to the selected group of trusted transportation providers. In an embodiment, if two trusted transportation providers (e.g., RIDEMATES™) are selected, a requester's mobile communication device transmits a populated transportation request to two trusted transportation provider's mobile communication devices through a RIDEPUL™ server and/or a RIDEPUL™ database (via the RIDEPUL™ API). In embodiments, a first trusted transportation provider to respond may be automatically assigned as a selected transportation provider. In embodiments, a first trusted transportation provider may determine if it is a selected transportation provider based on response time to transportation request and whether or not a first trusted transportation provider wants or desires to be assigned the transportation request. In embodiments, a selected transportation provider's mobile communication device or portable computing device communicates with a RIDEPUL™ server and/or database (via a RIDEPUL™ API) that it has accepted the transportation request. In embodiments, a RIDEPUL™ server and/or database may communicate the selected transportation provider's acceptance of the requested transportation request to the transportation requester's mobile communications device. In embodiments, a RIDEPUL™ server and/or database may communicate to the other transportation providers (e.g., RIDEMATES™) in a group that received the transportation request that a transportation request has been accepted and/or assigned to the selected transportation provider.

In alternative embodiments, a RIDEPUL™ server and/or database may receive a transportation request and identify a group of trusted transportation providers (e.g., RIDEMATES™). Continuing with this illustrative embodiment, a RIDEPUL™ server and/or database may identify a selected trusted transportation provider based on a variety of factors (e.g., geographic locations as compared to a transportation requester, prior rider satisfaction ratings, number of previous transportation requests assigned and completed in a predetermined time period, etc.). For example, a RIDEPUL™ server and/or database may generate a highest rating for trusted transportation provider B (out of a group of trusted transportation providers A, B, C, D, and E) because of trusted transportation provider's B closeness to the transportation requester and an excellent user satisfaction rating. In embodiments, a RIDEPUL™ server and/or database (via the RIDEPUL™ API) may communicate a transportation request to a highest rated trusted transportation provider and the highest rated trusted transportation provider may accept and/or deny the transportation request. If a highest rated trusted transportation provider accepts a request, the trusted transportation provider transmits such acceptance to the RIDEPUL™ server and/or database (via the RIDEPUL™ API), which in turn communicates an acceptance with requester's mobile communication device. If a highest rated transportation providers denies a transportation request, the trusted transportation provider communicates a denial to a RIDEPUL™ server and/or database (via the RIDEPUL™ API). Continuing with this illustrative example, a RIDEPUL™ server and/or database may transmit a transportation request to a second highest rated trusted transportation provider and the process described above may be initiated and completed again. A process continues until one of the trusted transportation providers accepts the transportation request and is assigned to provide transportation services for a transportation requester. In embodiments, if a reason is not provided, a rating may suffer if enough transportation requests are denied.

Once the transportation service has been established (e.g., a provider has been assigned to the request), progress communications may be automatically generated and relayed to a transportation requester and/or a selected trusted transportation provider. In embodiments, progress communications may be relayed directly between requester mobile communication devices and/or selected trusted transportation provider mobile communication devices. In embodiments, progress communications may be relayed to transportation requesters and/or a selected trusted transportation providers (e.g., RIDEMATES™) using network communications and/or via a RIDEPUL™ server and/or RIDEPUL™ database (via the RIDEPUL™ API).

In embodiments, if a transportation provider does not pick up a transportation requester (or affiliate), for example, within a specific period of time, a transportation requester may cancel acceptance by the trusted transportation provider based on an assumption that the trusted transportation provider got lost, picked up another transportation request, had an emergency, etc. In embodiments, a RIDEPUL™ app or application software may select another transportation provider (e.g., a transportation provider that may have been the second to respond to the transportation request). In embodiments, after a transportation requester or related individual arrives at a desired destination, an arrival/drop off notification may be relayed to a transportation requester via any of the methods described above. Similarly, a request completed and/or arrival notification may be relayed to a selected trusted transportation provider via any of the communication methods described above. In embodiments, if a selected transportation provider does not send a trip/request completed or requester/affiliate dropped off indicator/alert, a transportation requestor may complete this task. For example, after a configured and/or threshold period of time, a transportation requester may receive a message and/or be presented a menu by a RIDEPUL™ app asking if the rider has been dropped off and requesting that a dropped-off or trip completed message be communicated to a RIDEPUL™ server and/or RIDEPUL™ database (via a RIDEPUL™ API).

In embodiments, transportation requesters may accumulate points or other usage indicators by submitting transportation requests and/or trusted transportation providers may accumulate points or other usage indicators for accepting and/or completing transportation requests. In embodiments, points may be stored in a memory housing a user's profile (e.g., like at a RIDEPUL™ server, a RIDEPUL™ mobile device application, or a RIDEPUL™ database). In embodiments, points may be utilized in rating trusted transportation providers. In embodiments, points may be monetized and provide greater benefits for drivers. In embodiments, favorable ratings of requesters and/or providers may cause a points to be increased for requestors or providers.

In embodiments, a fare or fee for a transportation request may be calculated automatically, utilizing the RIDEPUL™ software application, and may be shared and/or provided with transportation requesters and selected transportation providers (e.g., RIDEMATES™). In embodiments where transportation requesters may also be trusted transportation providers, credits may be automatically generated corresponding to a fare or fee, and may be accessed and/or transferred between profiles. For example, for one group, where the individuals in the group may be both providers and requesters, a credit system may be maintained where a transportation requester transfers credits to a transportation provider if a transportation request has been accepted and completed. In embodiments, credits may be redeemable/sharable/transferable between RIDEPUL™ system individuals.

In embodiments, transportation requesters and/or transportation provider may be able to generate and/or store a rating or feedback of the other party involved in the transportation transaction. Thus, if either party has a positive or negative experience, a reputation and/or rating of the transportation requester and/or provider may be impacted. Continuing with this illustrative embodiment, transportation requesters and/or providers may be motivated to perform and behave well, thereby increasing the quality of experience for both the transportation requesters and providers.

In embodiments, transportation requesters and/or transportation providers may also generate and store a preferred list or non-preferred list. In embodiments, transportation requesters and/or transportation providers may move from preferred list to non-preferred list, or vice-versa depending on experiences and/or availability of parties. In embodiments, a preferred list and/or non-preferred list may not be visible to other parties except for an entity that created the list.

Figure 1C:
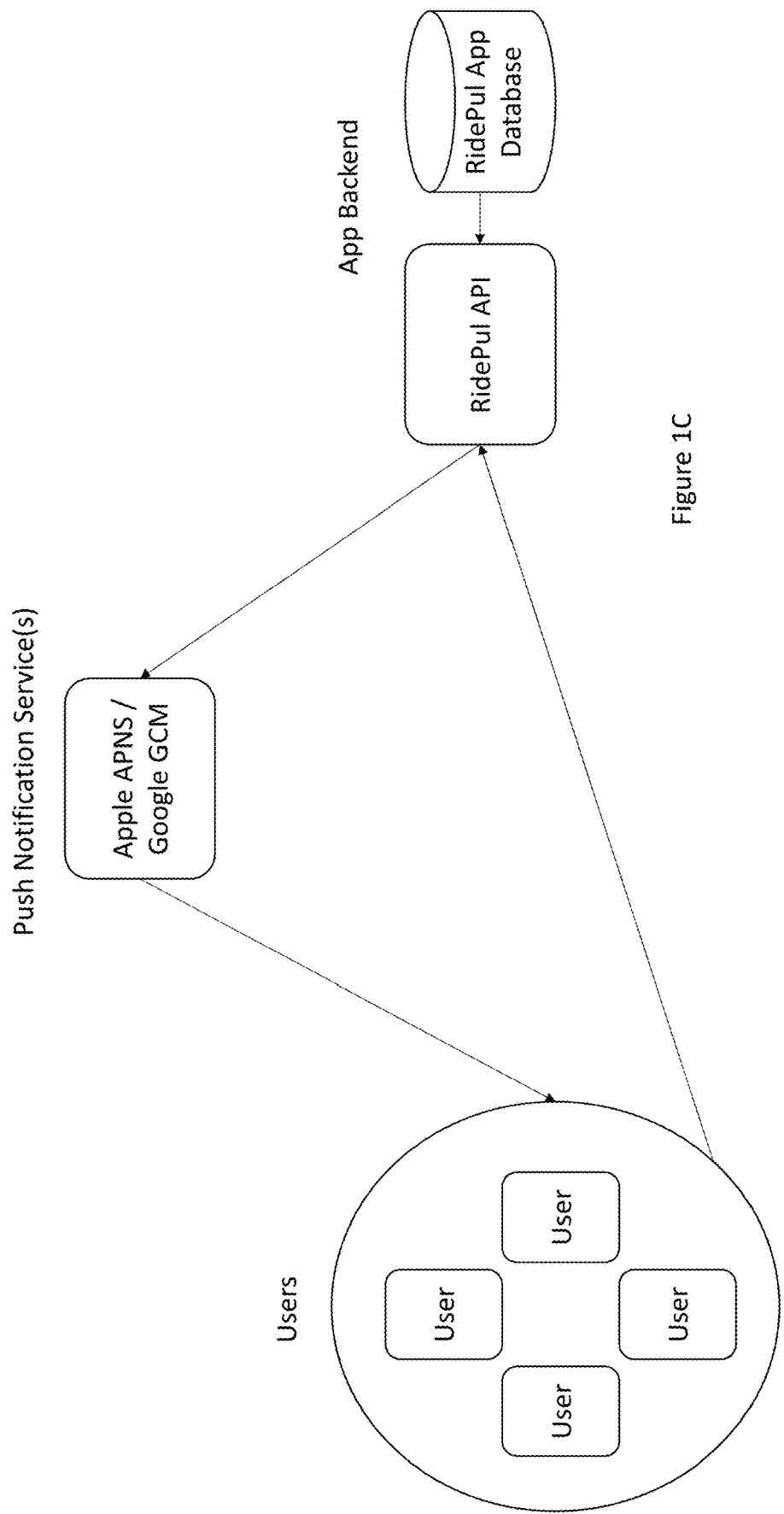

FIGS. 1A, 1B and 1C illustrate a block diagram and dataflow diagram of system and process associated with a transportation transaction utilizing transportation requesters and transportation providers according to embodiments. FIG. 2 illustrates a flowchart of a process associated with a transportation transaction utilizing transportation requesters and transportation providers according to embodiments.

In embodiments, FIG. 1A illustrates a RIDEPUL™ application user mobile communication devices or portable computing devices interfacing in a circle with at least one of, a server, a cloud host server, and/or an application backend. In embodiments, a RIDEPUL™ application backend comprises an Application Programming Interface ("API") and/or an Application Database. In embodiments, application users may register utilizing an API and/or Application Database. In embodiments, application user mobile communication devices incorporate the API to communicate with each other. In embodiments, an API communicates with cloud-based services on cloud-based servers to promote push notification for communicating between users/individuals mobile communication devices, as well as smartphone push notifications servers for network communications between RIDEPUL™ application user mobile communication devices. In embodiments, for example as illustrated in FIG. 1A, a smart phone push notification server may be an Apple Push Notification Service (APNS) server. In embodiments, a smart phone push notification server may be a Google Cloud Messaging (GCM) Cloud Connection Server (CCS) Google GCM server.

For example, as illustrated in FIG. 1A, cloud server may provide cloud services, and a cloud server may be hosted by a company by cloud host, such Parse.com, Google (GCM server), and/or Apple (APNS server). In this application, a smartphone push notification server and/or a cloud server may be referred to as a RIDEPUL™ server and/or RIDEPUL™ servers. In embodiments, a RIDEPUL™ application backend comprises an Application Programming Interface ("API") and/or an Application Database. In embodiments, application users may register utilizing an API and/or Application Database. In embodiments, application user mobile communication devices incorporate the API to communicate with each other. In embodiments, an API communicates with cloud-based services on cloud-based servers to promote push notification for communicating between users/individuals mobile communication devices, as well as smartphone push notifications servers for network communications between RIDEPUL™ application user mobile communication devices. In embodiments, for example as illustrated in FIGS. 1A and 1C, a smart phone push notification server may be an Apple APNS or a Google GCN server. For example, as illustrated in FIGS. 1A and 1C, cloud server may provide cloud services, and a cloud server may be hosted by a company by cloud host, such as Parse.com, an Apple APNS server, and/or a Google GCN server. In this application, a smartphone push notification server and/or a cloud server may be referred to as a RIDEPUL™ server and/or RIDEPUL™ servers.

Figure 2A:
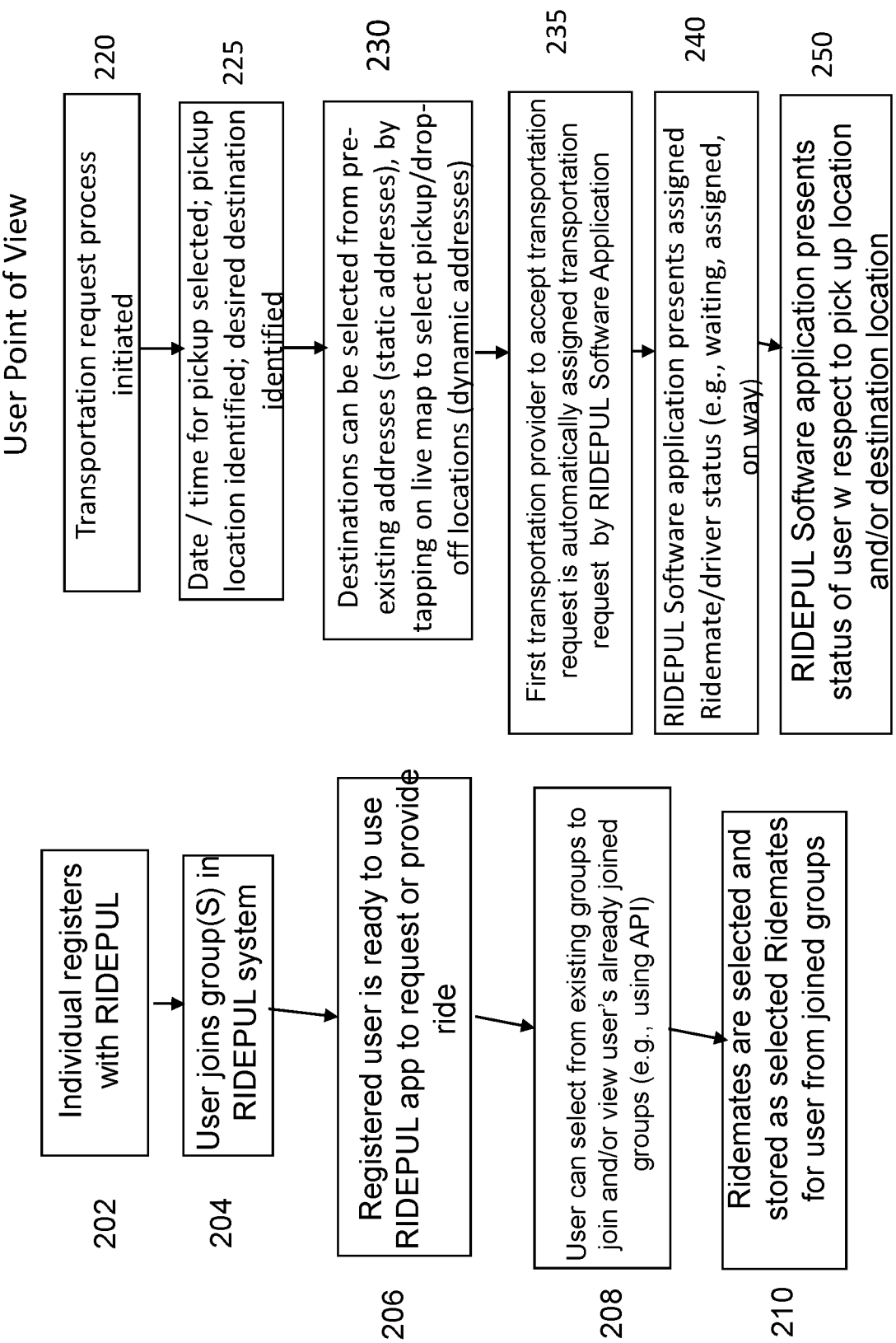
FIGS. 2A and 2B illustrate a flowchart of a process associated with a transportation transaction utilizing transportation requesters and transportation providers according to embodiments.
Figure 2B:
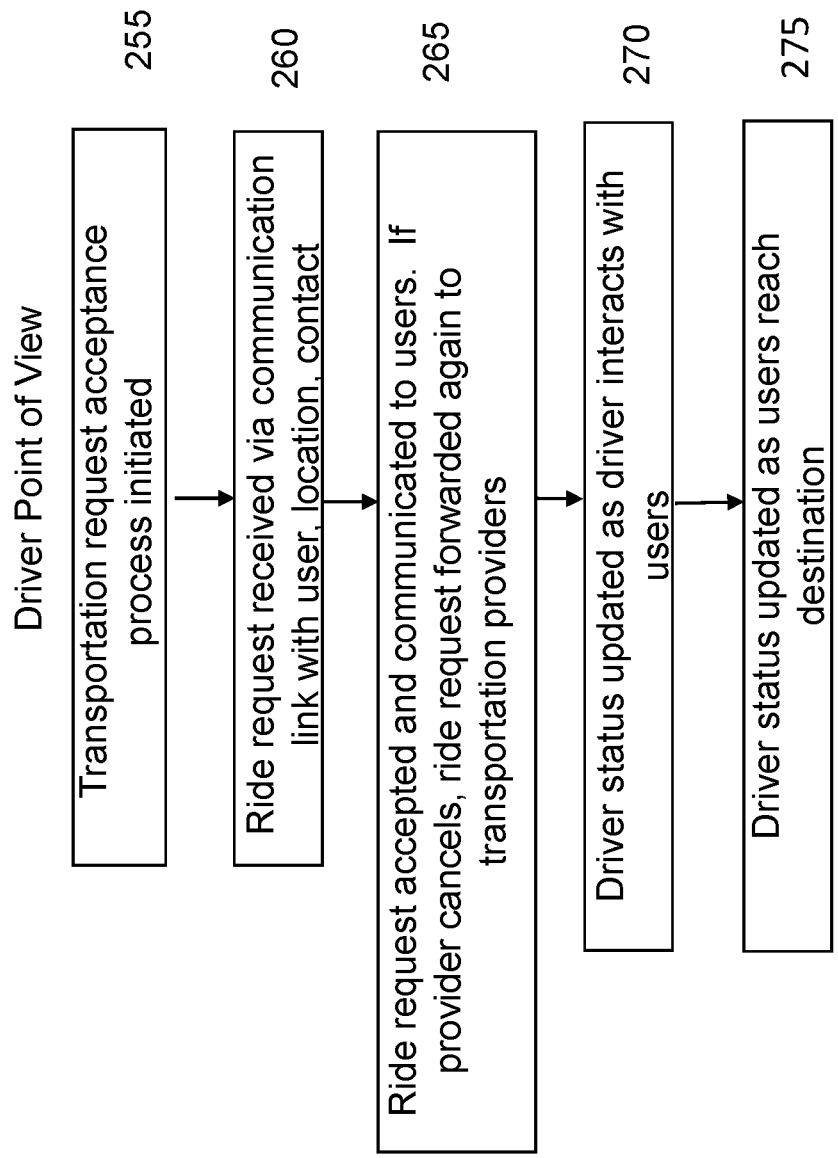

FIGS. 2A and 2B illustrate a flowchart of a process associated with a transportation transaction utilizing transportation requesters and transportation providers according to embodiments. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 202-275. Also, the order of blocks 202-275 may be merely an example order.

As illustrated in FIG. 2A, at step 202, an individual may register for RIDEPUL™ transportation services via a RIDEPUL™ API, which accesses a RIDEPUL™ database. In embodiments, an individual may create an account and enter personal information (e.g., name, contact information, email address, phone numbers, special requests, pre-defined pickup and drop-off addresses). Individuals may register with an application database in a variety of manners as is illustrated in FIG. 1B. In embodiments, an individual may utilize a RIDEPUL™ application running on a smartphone (e.g., mobile communication device) to access a RIDEPUL™ application database via a RIDEPUL™ API. In embodiments, an individual may utilize a RIDEPUL™ web/administration application running in a web browser on a mobile communication device to access a RIDEPUL™ application database via a RIDEPUL™ API. Entities may also create applications to access a RIDEPUL™ application database using a RIDEPUL™ API. In embodiments, entities may have a customer web application to access a RIDEPUL™ Application database via a RIDEPUL™ API. In embodiments, entities may have a customer mobile application to access a RIDEPUL™ Application database.

In embodiments, individuals may join 204 existing groups in a RIDEPUL™ system. In embodiments, a RIDEPUL™ API and/or RIDEPUL™ may retrieve a list of groups for an individual based on input search terms, input codes, and/or input identifiers. For example, common pickup locations, common destination addresses, common workplaces or educational institutions and/or common characteristics or activities (e.g., hiking, swimming, going to beach). In embodiments, a list of groups may be transmitted and/or communicated from the RIDEPUL™ database and/or API to an individual's mobile communication device (and presented via a RIDEPUL™ mobile application or a RIDEPUL™ web application). This feature of a RIDEPUL app allows a user to more efficiently setup and establish transportation transactions and provides an improvement over prior systems. In embodiments, selected groups may be communicated and/or transmitted to a RIDEPUL™ database via an RIDEPUL™ API and the selected groups may be stored in an individual's profile in a memory of a RIDEPUL™ application database. In embodiments, selected groups may have a number of transportation providers who are able to transport individuals/users or provide rides to affiliates of users. Affiliates may be children, parent, or relatives of individuals or users. Affiliates may also be close friends or business associates of individuals or users.

In embodiments, after registration, a registered user or individuals may be available or ready 206 to use RIDEPUL™ system. In embodiments, an individual may select 208 from existing groups to join and/or select from already joined groups (e.g., groups joined during a prior visit or during registration). In embodiments, existing groups and/or already joined groups may be retrieved from a RIDEPUL™ database utilizing a RIDEPUL™ AP. In embodiments, addresses (e.g., static addresses) may be pre-assigned to specific groups. In embodiments, an individual may select and/or identify whether an individual is a transportation requester or a transportation provider for a transportation transaction. In embodiments, an individual may select or determine 210 RIDEMATES™ for a transportation transaction. In embodiments, RIDEMATES™ selected from the joined groups may be stored in a memory of an individual's mobile communications device. In embodiments, RIDEMATES™ selected from joined groups may be stored in a memory of a RIDEPUL™ server and/or a RIDEPUL™ database (which is accessed via a RIDEPUL™ API). If a transportation transaction is a transportation request, the transportation provider may be referred to as a trusted transportation provider because the transportation provider is an individual that may be part of an acceptable, trusted and/or pre-verified group.

In embodiments, if a transportation transaction is a transportation request by an individual, a transportation request process may be initiated 220. In embodiments, a transportation request may be a request for an individual or an affiliate of an individual. In embodiments, a requester (e.g., individual who initiated transportation request) may provide 225 transportation request information to a RIDEPUL™ application. As an illustrative example, in embodiments, a transportation requester may enter a date and time for pickup. In embodiments, a transportation requester may provide or input a pickup address and a destination address. In embodiments, a requester may select and/or input 230 an address by selecting from a pre-existing address (stored in a memory of a RIDEPUL™ application which may also be referred to as a static address and/or static address selection), may physically enter address information into an input device of a mobile communications device, or may tap on a live map (e.g., digital map) of potential pickup and/or destination addresses (e.g., dynamic address selection). In embodiments, a completed transportation request may be referred to as a populated transportation request. In embodiments, a mobile communications device may communicate via a network (e.g., a wireless 802.11(a), (g), or (n), WiMax, or other PAN networks). In embodiments, a transportation request may comprise geo-aware information (e.g., location or location related information received via a GPS transceiver and/or components). In embodiments, geo-aware resources enable a device to automatically include geographic location information in a transportation request.

In embodiments, an individual's (or requester's) mobile communication device may communicate (and/or send) a transportation request to the RIDEPUL™ API, which may store information in the RIDEPUL™ Database (e.g., database server). In embodiments, a mobile communications device may automatically communicate (or send) the transportation request to the RIDEPUL™ server (e.g., a mobile device push notification server and/or a cloud based push notification server). In embodiments, a RIDEPUL™ server may communicate (or deliver) the transportation request to a selected group of transportation providers (which may be hereinafter referred to as trusted transportation providers. In embodiments, trusted transportation providers may review and/or consider a submitted or communicated transportation request.

In embodiments, mobile communication devices of trusted transportation providers may respond to a requester's transportation request in order to accept a transportation request to transport and/or drive an individual (or affiliate of an individual) to a destination location. In embodiments, the mobile communication devices of the trusted transportation provider may communicate a response through the RIDEPUL™ server in real-time or near real-time. In embodiments, the RIDEPUL™ API and/or RIDEPUL™ database may continue to monitor and/or record communications between transportation requesters and/or transportation provider. In embodiments, as illustrated in FIG. 2A, a first trusted transportation provider who responds to and accepts a transportation request may be assigned 235 the transportation request. In embodiments, an assignment of a transportation request is communicated or transmitted via the RIDEPUL™ servers to a RIDEPUL™ application on a requester's mobile communication device and/or the RIDEPUL™ API and/or RIDEPUL™ database for review and/or storage. In embodiments, a RIDEPUL™ API and/or RIDEPUL™ database may transmit or communicate status information to other trusted transportation providers identifying that another trusted transportation provider has been selected. After a transportation request has been accepted and/or assigned to a transportation provider, status information as to a requester's pickup may be communicated 240 between a requester's mobile communications device and a trusted transportation provider's mobile communications device. For example, this status information may include, but is not limited to, "assigned," "waiting for acceptance of assignment," "on way," or "arrived." In embodiments, after a requester (or requester's affiliate) has been picked up, a RIDEPUL™ application may communicate 250 status information as to a ride (or transportation transaction) to a requester's mobile communication device and a trusted transportation provider's mobile communications device. For example, this status information may include "on way to destination location," "x miles or kilometers from destination location," "dropped off," and/or "arrived at destination location." In embodiments, communication regarding status of a ride transaction or transportation transaction may be communicated between a requester's mobile communication device and a trusted transportation provider's communication device utilizing RIDEPUL™ servers and may be monitored, reviewed and/or stored by the RIDEPUL™ API and/or RIDEPUL™ database.

In embodiments, if an individual is a transportation provider, a RIDEPUL™ application may initiate 255 a transportation acceptance process. In embodiments, a transportation provider may receive 260 a ride or transportation request via a communications link (e.g., a wireless communication link) between a requester's mobile communication device and/or RIDEPUL™ servers (e.g., a RIDEPUL™ push notification server and/or a cloud-based RIDEPUL™ push notification server). In embodiments, a transportation provider may review a transportation request and/or account information of a transportation requester. In embodiments, a requester's account information may include a rating of a requester, a usage history (e.g., historical information of a requester, preferences of a requester, personal information of a requester (including height and/or age of requester or requester affiliate). In embodiments, a requester's transportation request may include geo-aware information, along with contact information (e.g., email addresses and/or phone numbers), time and date for request, address information (e.g., pickup and destination addresses), and special instructions.

In embodiments, a transportation provider may accept 265 a transportation request. In embodiments, if a transportation provider is a first to respond to a transportation request, then a RIDEPUL™ application may automatically assign the transportation request to a transportation provider and a transportation provider becomes an assigned and/or selected transportation provider. In embodiments, a selection or assignment of a transportation provider may be automatically communicated to a transportation requester's mobile communication device via a wireless communication link with RIDEPUL™ servers. In embodiments, a selection or assignment of a transportation provider may be reviewed, monitored and/or stored in a RIDEPUL™ database via a RIDEPUL™ API. In embodiments, if a transportation provider cancels an assignment or transportation request, RIDEPUL™ servers may forward the ride request or transportation request other selected transportation providers. In embodiments, a transportation requester may cancel a transportation request if a transportation provider has not picked-up a requester and/or affiliate.

As illustrated in FIG. 2B, After a transportation request has been accepted and/or assigned to a transportation provider, status information as to a provider's progress to a requesters (or affiliate's) pickup may be communicated 270 between a transportation provider's mobile communications device and a requester's mobile communications device. For example, this status information may include, but is not limited to, "assigned," "waiting for acceptance of assignment," "on way," and/or "arrived." In embodiments, after a requester (or requester's affiliate) has been picked up, a RIDEPUL™ application may communicate 270 status information as to a ride (or transportation transaction) to a transportation provider's mobile communication device and a transportation requester's mobile communications device. In embodiments, communication regarding status of a ride transaction or transportation transaction may be communicated between a requester's mobile communication device and a trusted transportation provider's communication device utilizing RIDEPUL™ servers and may be monitored, reviewed and/or stored by the RIDEPUL™ API and/or RIDEPUL™ database.

Figure 3:
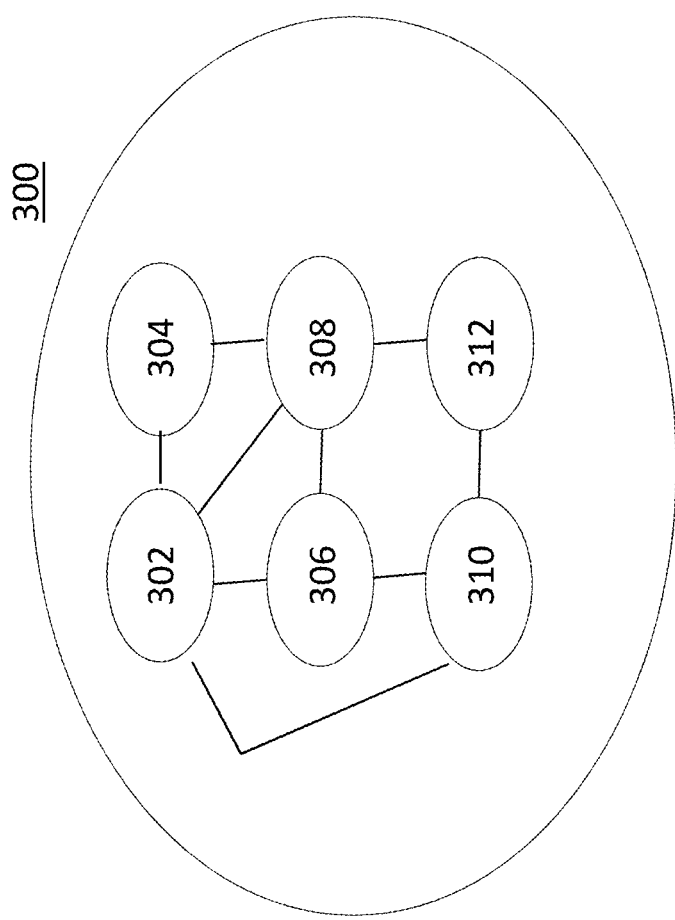
FIG. 3 illustrates a mobile communications device that may be utilized by either transportation requesters and/or transportation providers in implementing the methods and processes described herein according to embodiments.

FIG. 3 illustrates a mobile communications device that may be utilized by either transportation requesters and/or transportation providers in implementing the methods and processes described herein according to embodiments. FIG. 3 may be illustrative of a requester mobile communication device and/or a provider mobile communication device. Mobile communications device, mobile computing device, wireless communications device, and/or mobile terminals are used interchangeably herein. Example mobile communication devices may include, but are not limited to, a wireless tablet device, a smartphone having cellular telephony and data communication capabilities, netbook, network device, laptop, and/or GPS computing device. In embodiments, a mobile communication device 300 may include a processor 302, memory devices or resources 304, network communication transceivers and/or components 306, GPS transceivers and/or components 308, and a graphical user interface (GUI) 310 which may be included for relaying visual information via the wireless communications device 300. In embodiments, busses, paths, and interfaces may be incorporated to provide electrical communication within or between components of a wireless communication device 300. In embodiments, a mobile communication device 300 may also comprise sensors 312, including barometers, potentiometers, and/or accelerometers.

In embodiments, network communication transceivers and/or components 306 may allow and/or enable wireless connectivity for the mobile communications device. In embodiments, the network communication transceivers and/or components 306 may include radios or modems, as well as software or logic for enabling network interfaces and/or ports though use of the radios and/or modems. Illustratively, the network communication transceivers and/or components 306 may include, for example, a cellular voice and data interface to enable the mobile communications device 300 to receive and/or send network communications over a cellular transportation network, including communications to other mobile communications devices, servers, computing devices, and/or databases. In embodiments, for example, a mobile communications device 300 may transmit device identification (e.g., cellular number or ID number) and/or geo-aware communications (e.g., communications identifying location or representing signal characteristics of transmitted signals). In embodiments, the network communication transceivers and/or components 306 may comprise a wireless network interface for connecting to access points or other computing devices, incorporating 802.11(a or g), 802.11(n), WiMax or other personal area network communication protocols.

In embodiments, a mobile communications device 300 may utilize geo-aware resources, e.g., GPS transceivers and/or components 308, and/or network transceivers and/or components 306 to communicate with GPS satellites, other mobile communication devices, or other computing devices, servers, and/or databases over cellular, roaming, and/or other telecommunication networks. The mobile communication device 300 may also utilize other software, the processor 302, and/or memory/memory devices 304. Illustratively, a processor 302 may execute programming instructions in order to auto-locate and/or geo-locate a mobile communications device and communicate and/or transmit geo-location information to other mobile communications devices involved in a transportation transaction (e.g., transportation requester mobile communications devices and/or transportation provider mobile communication devices). In embodiments, such functionality, as implemented by computer-executable instructions, may correspond to an individual's request for transportation, in which geographic and/or geo-location information may be automatically included within the transportation request. In embodiments, such functionality may also allow and/or enable communications of geo-aware communications from a transportation provider, e.g., which may automatically communicate its geographic information of a transportation provider's status and/or location.

In embodiments, a processor 302 in a mobile communications device 300 may execute instructions, which may utilize GPS transceivers and/or components 308, to enable and/or allow mapping or similar graphical presentations of geographic identification information. For example, digital maps may be stored and/or retrieved in memory 304 on a mobile communications device 300 to present a position of a transportation requester (or affiliate) and/or transportation provider at a specified moment (e.g., a current location, past location, or estimated future location). In embodiments, GPS transceivers and/or components 308 may provide GPS coordinates and/or related information to a processor 302, which may utilize geo-presentation resources to present maps of either parties' positions. In embodiments, a processor 302 may also receive GPS coordinates and/or related location information from a network (or other computing devices or wireless communications devices communicating over the network), and use the geo-presentation resources and the received GPS coordinates and/or related information to present a location of another party (e.g., one or more transportation providers) at a pre-identified time (current time, past time or estimate for a future time). Information may be stored in a memory/memory device 304.

In embodiments, a wireless communications device 300 may also include an accelerometer (or other sensor 312) that provides sensor information (e.g., acceleration information) to a processor 302. In embodiments, sensor information may be used by a processor 302, alone or along with computer-executable instructions, to determine driving information related to a transportation requester and/or a transportation provider. Continuing with this illustrative example, sensor information may comprise stop, speed, yah, and/or waiting times. In embodiments, a processor may use GPS data (and/or related information) and sensor information (e.g., acceleration information) to determine mobile communication device (i) position information, such as pickup and drop-off locations and route information for distance traveled, and router information or distance traveled in transportation transaction; and (ii) stop/speed/wait times. In embodiments, this information may be helpful particularly if transportation requester is requesting transportation for an affiliate, such as a minor or an elderly family member, who may be taken advantage of. In embodiments, this may allow a transportation requester to validate or confirm the safeness and integrity of a transportation provider.

FIGS. 4-10 describe an embodiment and/or process for registering in a RIDEPUL™ group and then initiating and completing arrangement of transportation between members of a RIDEPUL™ group (e.g., RIDEMATES™). It should be understood that the described process may be implemented or installed in various other configurations, situations, and scenarios with minimal, no change, or no material change to the process and/or function without departing from the invention. Accordingly, other configurations, situations and scenarios may be covered, described and/or claimed under the invention described herein.

Figure 4A:
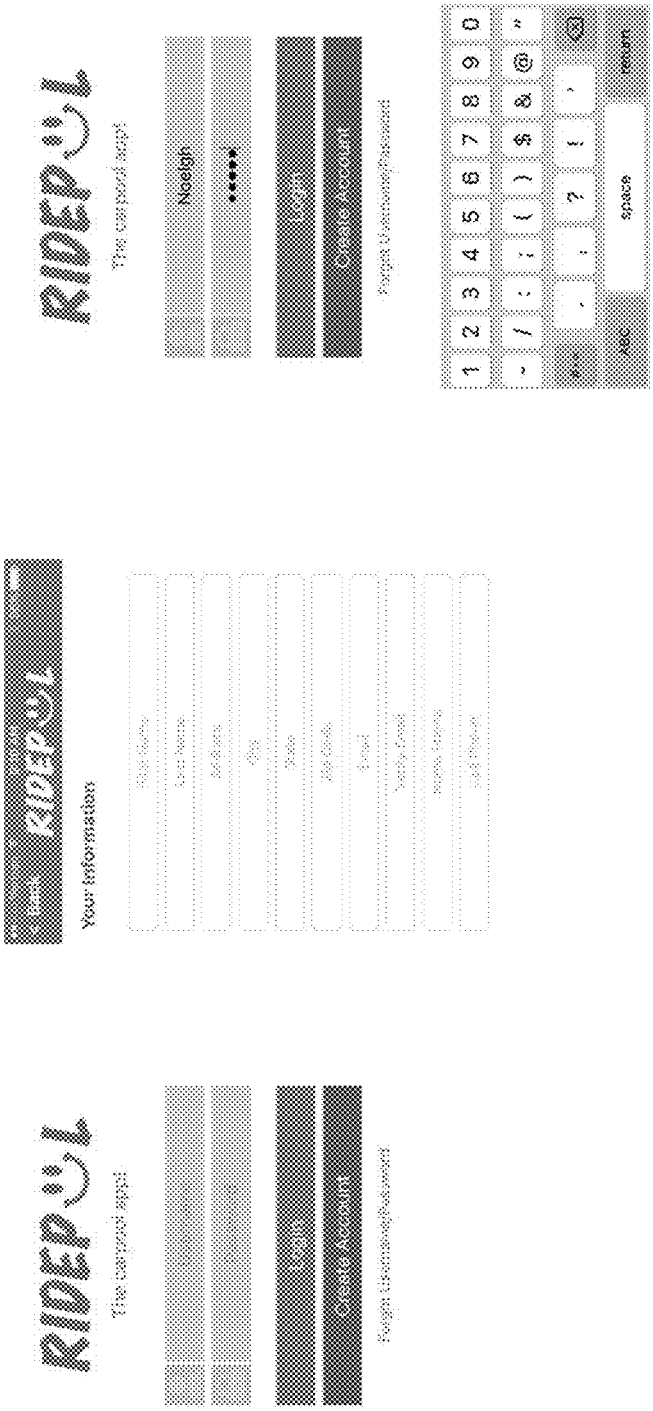
FIG. 4A illustrates registration screens for a transportation arrangement service according to an embodiment.

FIG. 4A illustrates registration screens for a transportation arrangement/transaction service according to an embodiment. In embodiments, application screens or menus may be retrieved from a memory of a mobile communications device and presented to an individual via a screen of a mobile communications device. In embodiments, application screens or menus may be retrieved from a RIDEPUL™ database utilizing a RIDEPUL™ API and communicated to a RIDEPUL™ application on a mobile communications device (or alternatively retrieved from RIDEPUL™ servers and/or communicated to a RIDEPUL™ application on a mobile communications device). In embodiments, a RIDEPUL™ application may retrieve an initial registration screen and an individual may create an account name by entering, for example, a user name and password. In embodiments, a mobile communications device may transmit and/or communicate the user name and password to the RIDEPUL™ Application Database via a RIDEPUL™ API. In embodiments, a RIDEPUL™ server may retrieve registration screens which are transmitted to the individual's mobile communication device. In embodiments, an individual may enter personal information into a registration screen, including but not limited to, individual first name, individual last name, address, city, and/or state, individual work, cellular and/or home phone numbers, and individual email address (or addresses). An individual may select to create a RIDEPUL™ account. In embodiments, an individual's account information may be transmitted to the RIDEPUL™ application database (utilizing a RIDEPUL™ API) where an individual's account is created and stored in a memory.

FIG. 4A2 illustrates another registration process according to embodiments. FIG. 4A2 includes a registration process discussed above with respect to FIG. 4A with an addition of allowing a photo to be added. In embodiments, a RIDEPUL app may accept as input a photo of a user. In embodiments, a RIDEPUL app may present a camera icon to allow a user to capture an image and store this user image with other user information into a user's account information.

After registration is completed, an individual may join groups of individuals. In embodiments, the groups may comprise individuals that may provide transportation to an individual or someone related to the individual (e.g., an affiliate, a family member, a close friend, a business colleague). As described above, a group may comprise trusted parents of children at a local school, trusted individuals who work for a company at a specific location, and/or trusted neighbors who live within a predefined radius of the individual. In embodiments, a software application on a computing device may receive as input group information in order to create new groups. In embodiments, a computing device may be a mobile communications device, a smart phone, a personal computer, a laptop computer, a tablet computer and/or a wearable computing device having a software application stored in one or more memory modules and executed by one or more processors that includes functionality for creating groups. In embodiments, a system administrator or other authorized users may have a software application to receive input to create groups and may initiate creation of groups on any of the computing devices described above. In embodiments, a software application may automatically search a computing device for group input creation information. In order to create a group, a software application may receive group information such as group name, add code, member cell phone number, member email address, indicator as to whether a new group is a static group (no new members allowed) or a dynamic group (new members allowed). In embodiments, a software application may receive as input additional group information such as company name, geographic limitations, geographic locations and/or group logo image).

In embodiments, upon initiation by a user and/or an administrator (e.g., via a submit button), a software application may transmit and/or communicate group information to a web application server. In embodiments, a web application server may be a RIDEPUL application server. In embodiments, a web application server may validate and/or verify input group information. In embodiments, validation and/or verification may comprise checking email addresses for accuracy and authenticity by sending messages to members and/or checking with providers to verify authenticity of emails and/or phone numbers; verifying group name is accurate and available; and/or verifying geographic location is authentic and/or accurate. In embodiments, a web application server may validate or verify, utilizing $3^{rd}$ party governmental and/or commercial servers, that members do not have criminal records, have a license, have insurance for a transportation vehicle and have a registration for the transportation vehicle. In other words, a web application server may communicate with a DMV server, a CARFAX server, insurance servers, and/or state, local and federal criminal databases. In embodiments, if a web application server validates and/or verifies submitted group information, a web application server may create a group entry in a database. In embodiments, a database may be a RIDEPUL database. In embodiments, group information may be stored in a secure database in an application server.

Figure 4B:
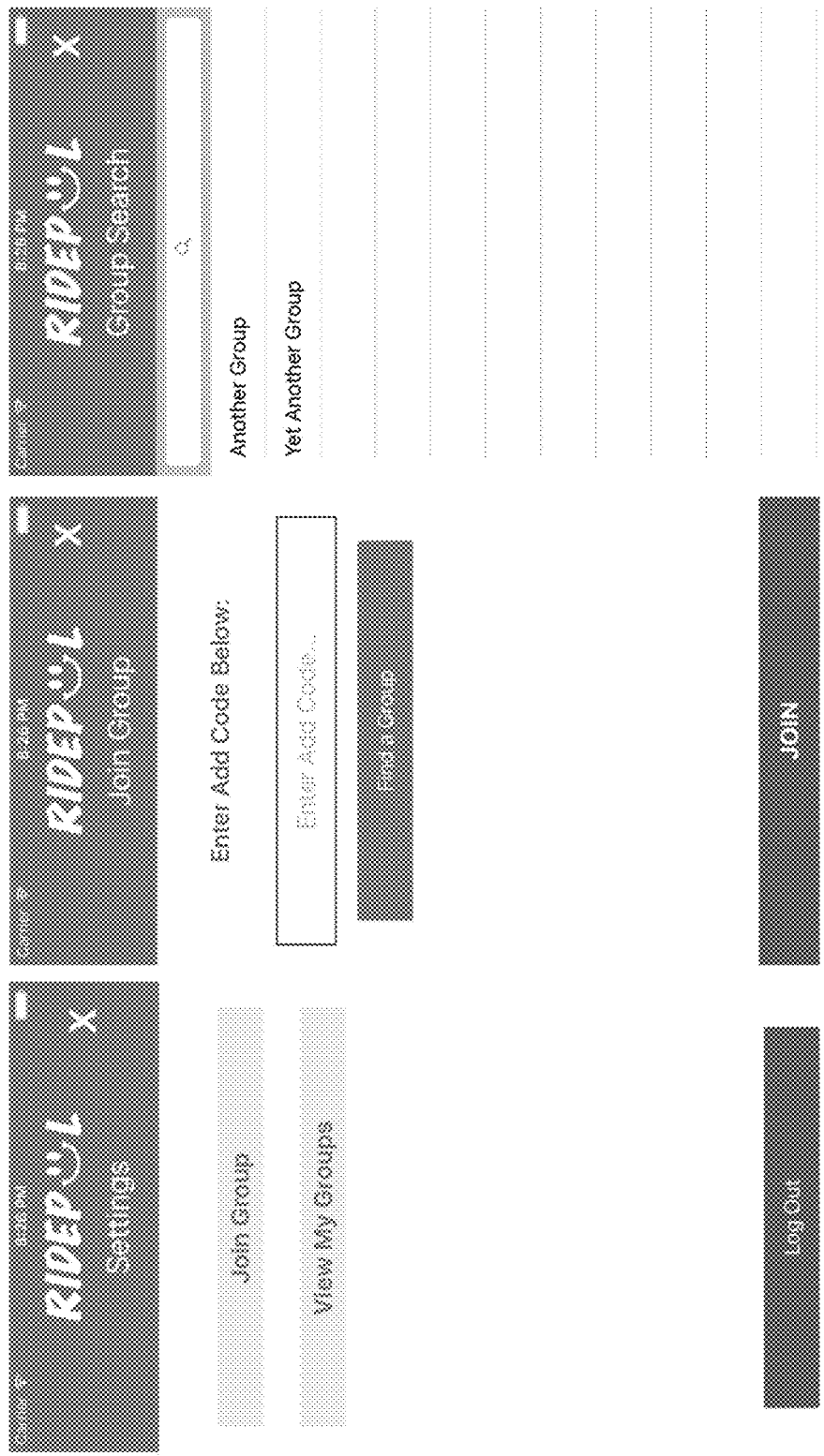
FIG. 4B illustrates group registration screens according to an embodiment.

FIG. 4B illustrates group registration screens according to an embodiment. In embodiments, a RIDEPUL™ software application may retrieve a group registration screen from a RIDEPUL application server which presents an individual with an option to join a group and/or view existing groups during a registration process. In embodiments, an individual may select to join a group by entering a code, a group name, and/or another group identifier as illustrated by a central screen shot in FIG. 4B. This is also illustrated by a screen shot in FIG. 4B2. In embodiments, a RIDEPUL software application may also receive as input that a newly registered user may wish to add members of an added group to a list of a user's RIDEMATES. FIG. 4B2 illustrates that by selection of a button and/or icon, a user can choose to automatically become RideMates with all users to the group. Alternatively, a user may select no and later selected which RIDEMATES a user is associated with. In embodiments, an individual can search for existing groups by entering keywords or other searchable information. In embodiments, a group search request is sent from the mobile communications device to a RIDEPUL™ server and/or a RIDEPUL™ database (utilizing a RIDEPUL™ API). In embodiments, a RIDEPUL™ server and/or a RIDEPUL™ database plus RIDEPUL™ API, may retrieve group information, from a memory, corresponding to input search terms, codes, group names, and/or group identifiers and transmit or communicate retrieved groups to a RIDEPUL™ application on a mobile communication device. In embodiments, a mobile communications device may display retrieved groups to an individual.

FIG. 4C illustrates a trusted transportation request selection group according to an embodiment. In FIG. 4C, an individual may initiate a RIDEPUL software application and then initiate requesting of trusted transportation. In embodiments, an individual may input into a RIDEPUL software application a transportation request time and date, special instructions for the transportation request, and/or an amount that an individual is willing to pay. FIG. 4C illustrates screen shots to allow a user to provide input for a transportation request. In embodiments, a RIDEPUL™ software application may transmit or communicate a request to a RIDEPUL™ application server and/or a RIDEPUL™ database (in some cases utilizing a RIDEPUL™ API).

Figure 5:
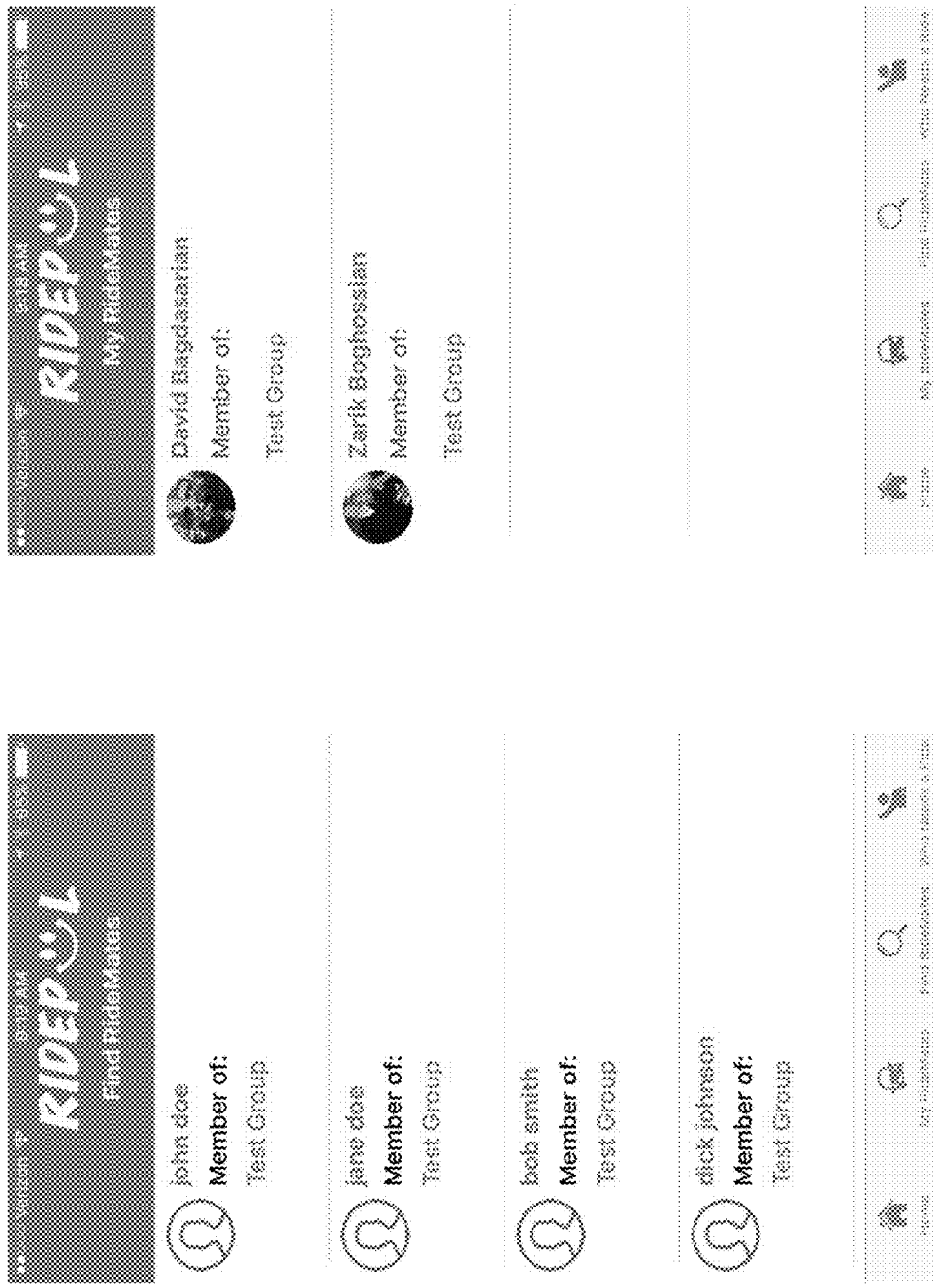
FIG. 5 illustrates a trusted transportation provider selection screen according to an embodiment.
Figure 6:
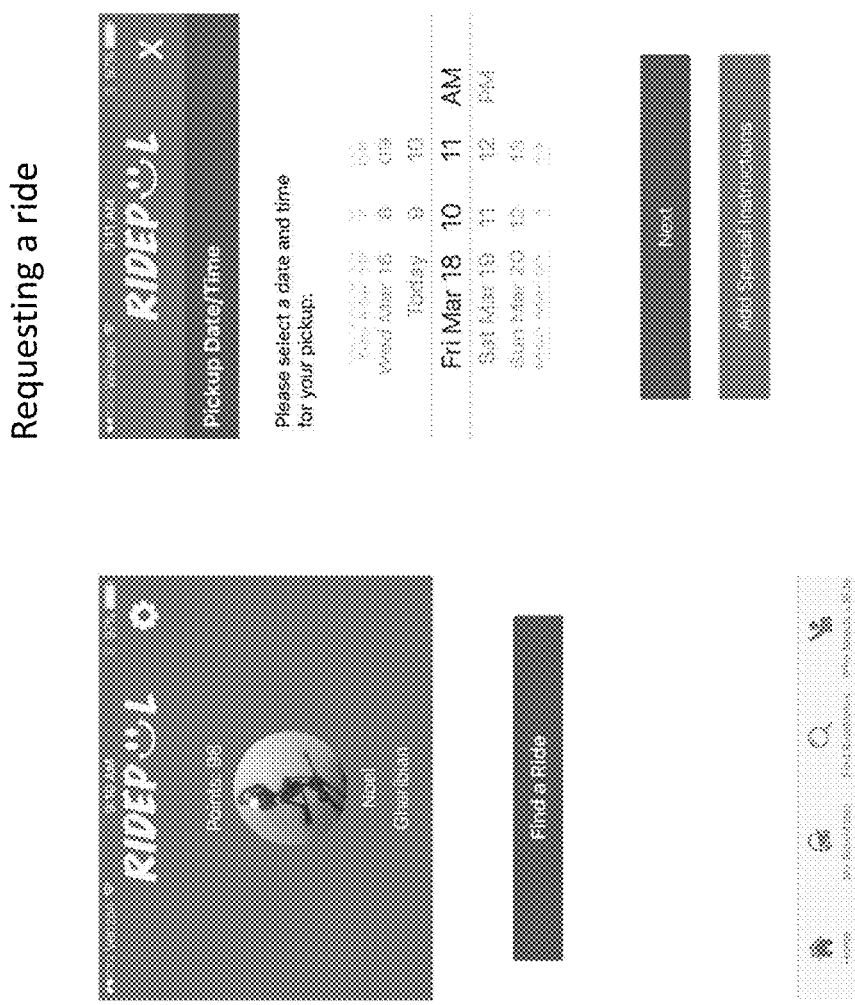
FIG. 6 illustrate a transportation date request screen according to an embodiment.

FIG. 5 illustrates a slightly modified trusted transportation provider selection screen according to an embodiment. In FIG. 5, the Group is selected first before the time of the request is entered (as is shown in FIG. 6). In embodiments, a trusted transportation provider may be referred to as a RIDEMATE™. In FIG. 5, an individual may have requested trusted transportation providers from groups to which the individual belongs for an upcoming transportation request. In embodiments, a RIDEPUL™ software application may transmit or communicate a request to a RIDEPUL™ server and/or a RIDEPUL™ database (utilizing a RIDEPUL™ API). In embodiments, the RIDEPUL™ server and/or RIDEPUL™ database (utilizing a RIDEPUL™ API) transmits or communicates identified trusted transportation providers to a RIDEPUL™ application on a mobile communications device. For example, as illustrated in FIG. 5, trusted transportation providers (e.g., RIDEMATES™) may comprise John Doe, Jane Doe, Bob Smith and Dick Johnson. In embodiments, an individual may select trusted transportation providers to complete a current or upcoming transportation request. As illustrated in FIG. 5, David Bagdasarian and Zarik Boghossian have been selected by an individual as trusted transportation providers to be utilized for a current or upcoming transportation request. In embodiments, selected trusted transportation providers may be referred to as "My Ridemates."

FIG. 6 illustrate a transportation date request screen according to an embodiment. In embodiments, an individual may initiate a request for transportation of the individual or a related individual. In embodiments, an individual selects a data and time for pickup for a transportation request (e.g., current or in future). In an embodiment illustrated in FIG. 6, a transportation request for Friday, March 18 is selected and/or requested.

Figure 7:
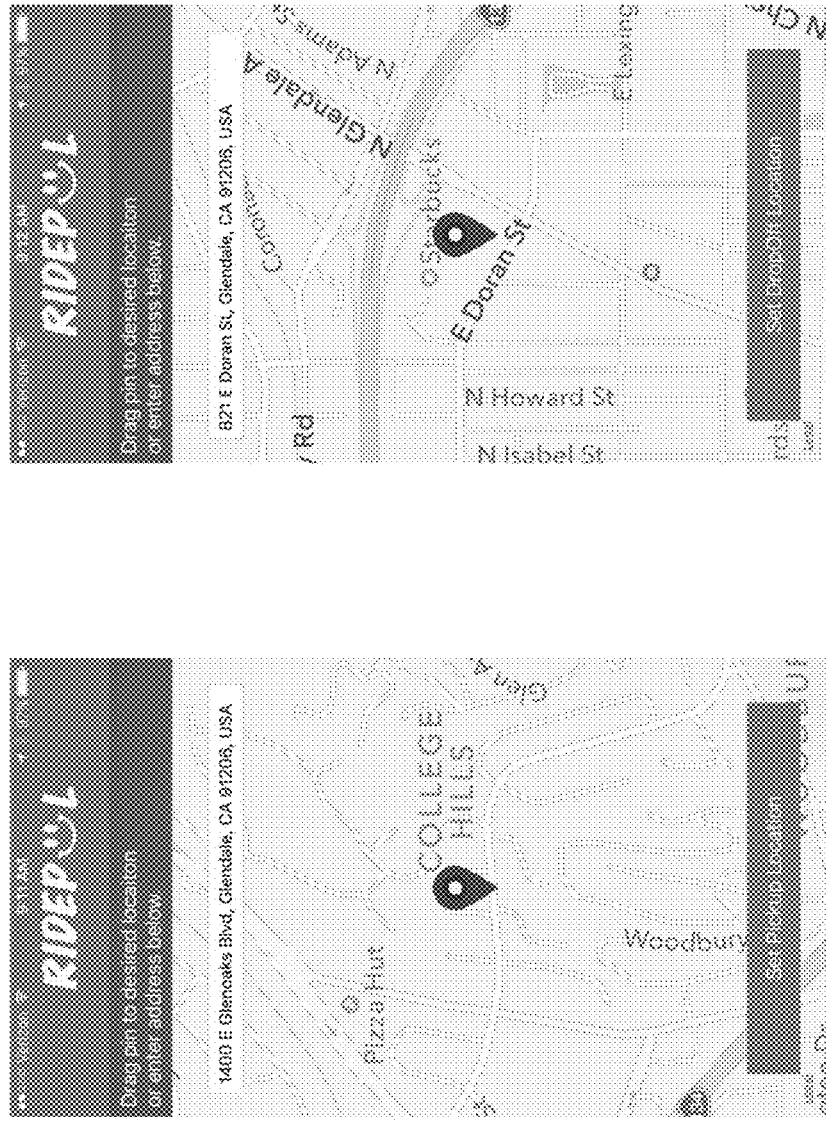
FIG. 7 illustrates a transportation request address screen according to embodiments.

FIG. 7 illustrates a transportation request address screen according to embodiments. In embodiments, an individual may select a pickup address and/or an individual may select a destination address. In embodiments, an address may be input via a text input device, e.g., a keyboard or via voice recognition, or may be input by selecting an area on a map displayed on a mobile communication device (e.g., by dragging a pin to a selected location.) As is illustrated in FIG. 7, an individual has entered a pickup location and/or destination location by dragging pins to locations on a digital map displayed on a mobile communications device. In embodiments, static address inputs or dynamic address inputs may be utilized. FIG. 7B illustrates an alternate embodiment where a user selects a group (e.g., a test group) in a RIDEPUL™ software application (as is illustrated by a selection of Test Group in a left most input screen of FIG. 7B. In this embodiment, after a group is selected, dynamic address selection is initiated by a RIDEPUL™ software application. Dynamic address selection is illustrated by the middle panels in FIG. 7B and is described in detail with respect to FIG. 9 below. In embodiments, after addresses are selected, a RIDEPUL software application may generate a status indicator screen (e.g. such as "Waiting for Ridemates" screen as shown by a right most screen shot in FIG. 7B).

Figure 8:
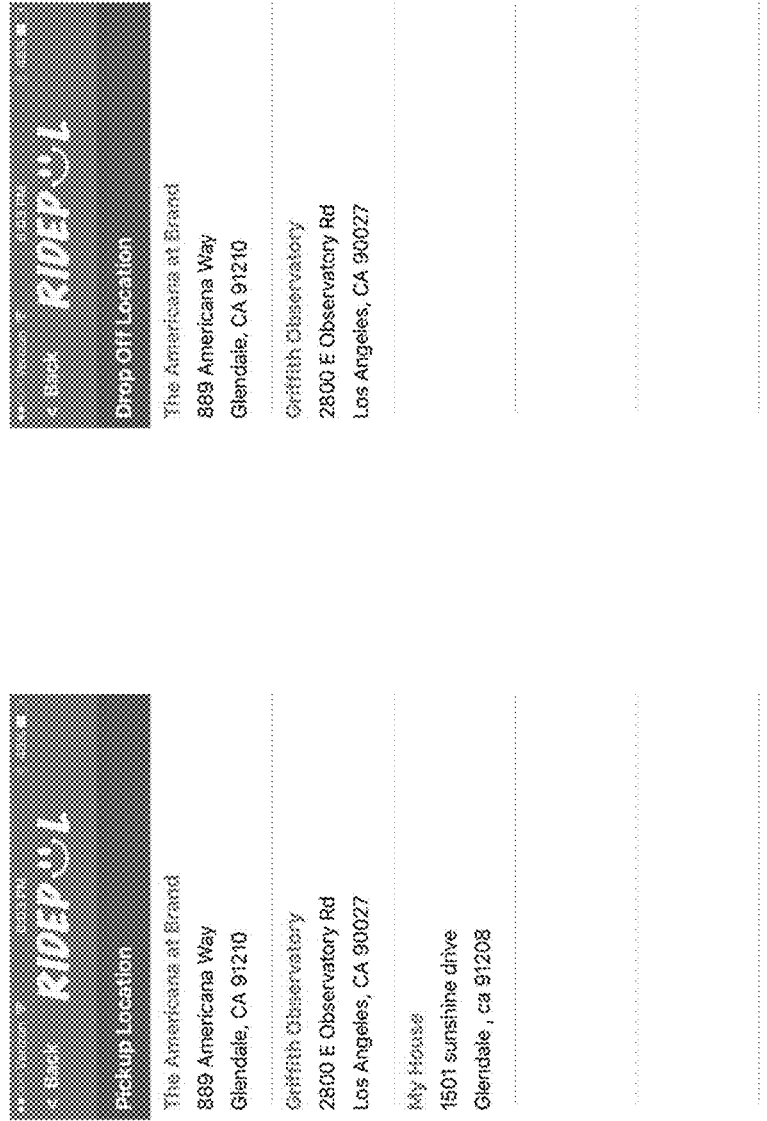
FIG. 8 illustrates a static address assignment according to embodiments.
Figure 8B:
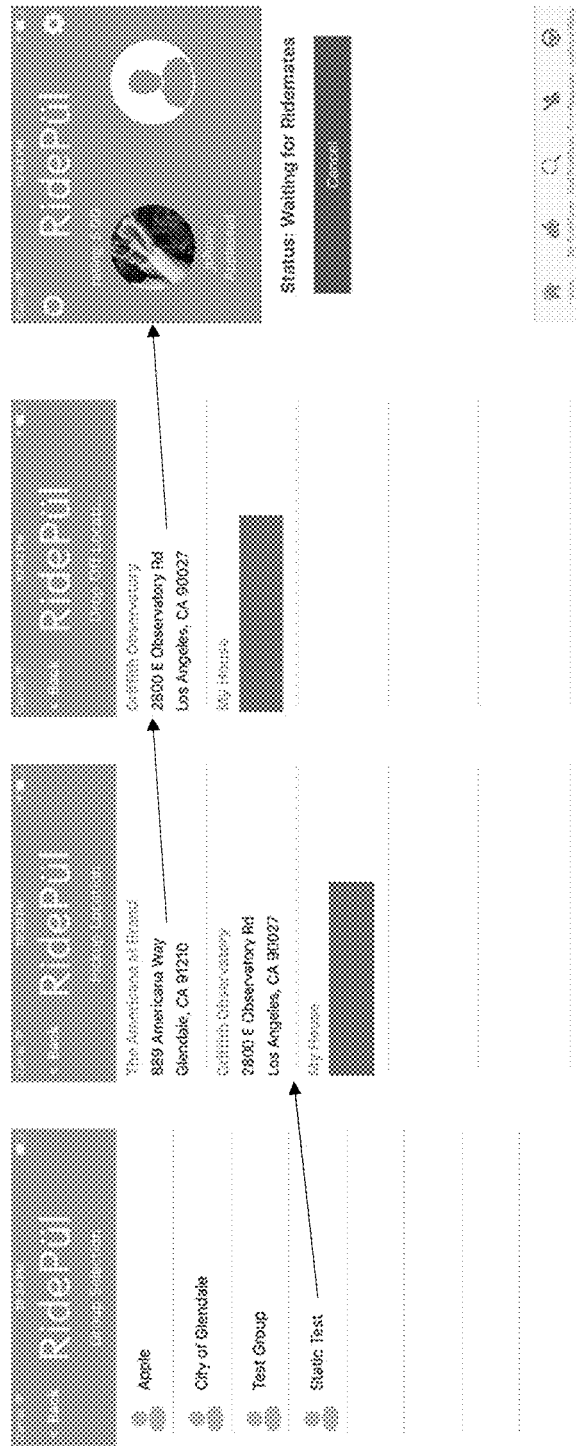
FIG. 8B illustrates a slightly modified version of a static group address assignment and/or selection screen according to embodiments

FIG. 8 illustrates a static address assignment according to embodiments. In embodiments, an individual may input address information via a RIDEPUL™ application on a mobile communication device that may be stored in a memory of a RIDEPUL™ server and/or RIDEPUL™ database. In embodiments, stored addresses may be addresses that are utilized frequently and/or on a periodic basis by an individual, and may be created utilizing historical information. In embodiments, illustrated in FIG. 8, addresses may be input via a RIDEPUL™ application on a mobile communications device. In embodiments, as is illustrated in FIG. 8, pre-assigned or static pickup locations may be The Americana at Brand, the Griffith Observatory, and/or an individual's house. In embodiments, as is illustrated in FIG. 8, pre-assigned or static destination and/or drop-off locations may be The Americana at Brand and/or the Griffith Observatory. FIG. 8B illustrates a slightly modified version of a static group address assignment and/or selection screen according to embodiments. As illustrated by left most panel in FIG. 8B, a group may be selected by an individual and a RIDEPUL software application may generate and communicate static pickup address screens and/or static destination address screens as shown in the center panels in FIG. 8B. After a pickup address and a destination address are selected, RIDEPUL software application may generate a status indicator screen (e.g. such as "Waiting for Ridemates" screen as shown by a right most screen shot in FIG. 8B).

Figure 9:
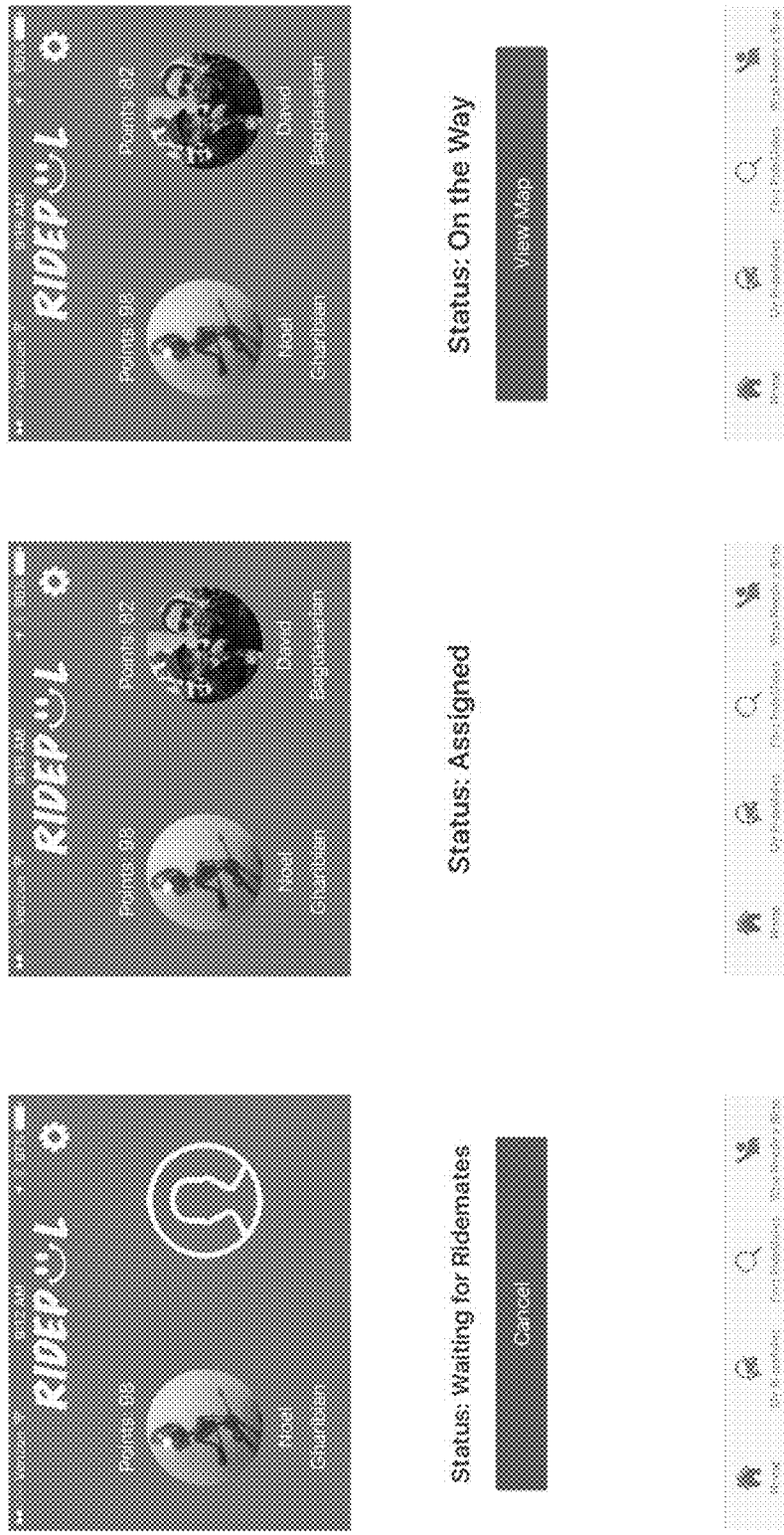
FIG. 9 illustrates a transportation requester's screen shot as a trusted transportation provider is being assigned according to embodiments.

FIG. 9 illustrates a transportation requester's screen shot as a trusted transportation provider is being assigned according to embodiments. In embodiments, a transportation requester's information (e.g., date, time, pickup location, drop-off location, trusted transportation providers) may be transmitted from the RIDEPUL™ application on a mobile communications device to a RIDEPUL™ Server and/or a RIDEPUL™ database (utilizing a RIDEPUL™ API). The RIDEPUL™ Server and/or RIDEPUL™ database (utilizing the RIDEPUL™ API) may communicate with mobile communication devices and/or computing devices corresponding to trusted transportation providers to assign a trusted transportation provider for a request from the individual (e.g., transportation requester). After a trusted transportation provider has been selected, the RIDEPUL™ Server and/or RIDEPUL™ database (utilizing the RIDEPUL™ API) may transmit or communicate a selected trusted transportation provider to a RIDEPUL™ application on a mobile communication device that made the request. FIG. 9 illustrates status screen shots for a transportation request process according to embodiments. As is illustrated a first screen shot, Noel Gharibian requested a trusted transportation provider and may be waiting for a trusted transportation provider to be assigned. As illustrated in second screen shot, David Bagdasarian has been selected and/or assigned as Noel's trusted transportation provider. As is illustrated in a third screen shot in FIG. 9, David Bagdasarian may be on the way to picking up Noel (or an individual related to Noel) from an input pickup location.

Figure 9B:
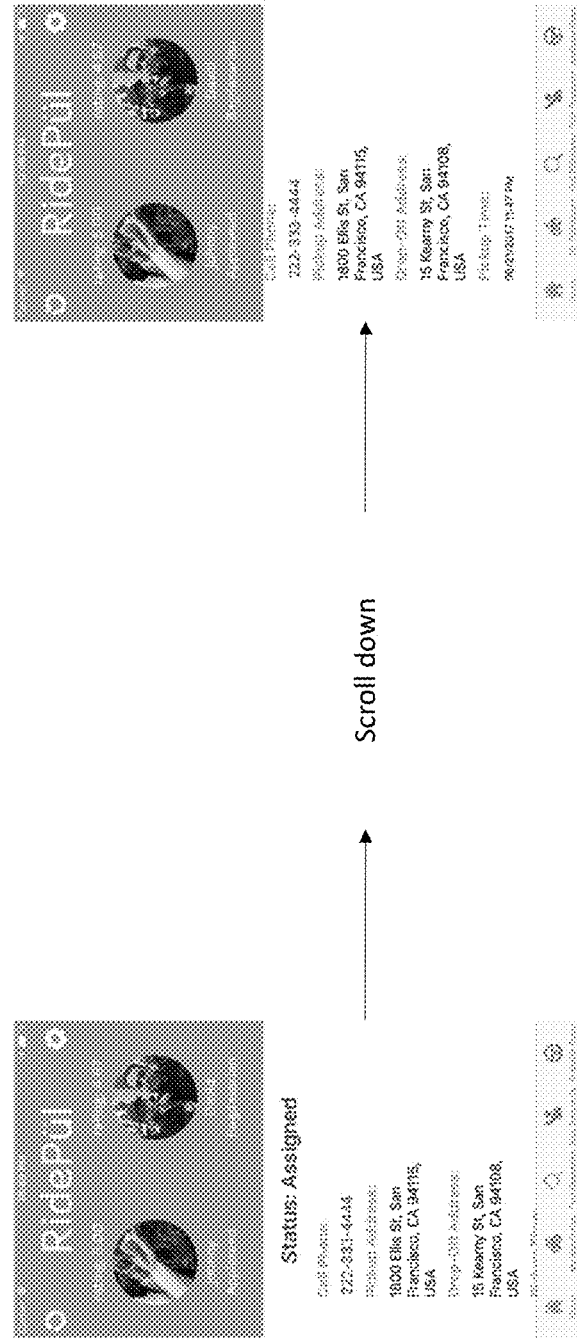
FIG. 9B illustrates an additional transportation requester's screen shot as a trusted transportation provider is being assigned according to embodiment.

In embodiments, a transportation requester, e.g., may close a transportation request loop and terminate the transportation transaction. For example, Noel Gharibian may close the loop and terminate the transaction by clicking "Not picked up" button in case the transportation provider (e.g., driver (David)) does not show up as intended. FIG. 9B illustrates an additional transportation requester's screen shot as a trusted transportation provider is being assigned according to embodiment.

Figure 10:
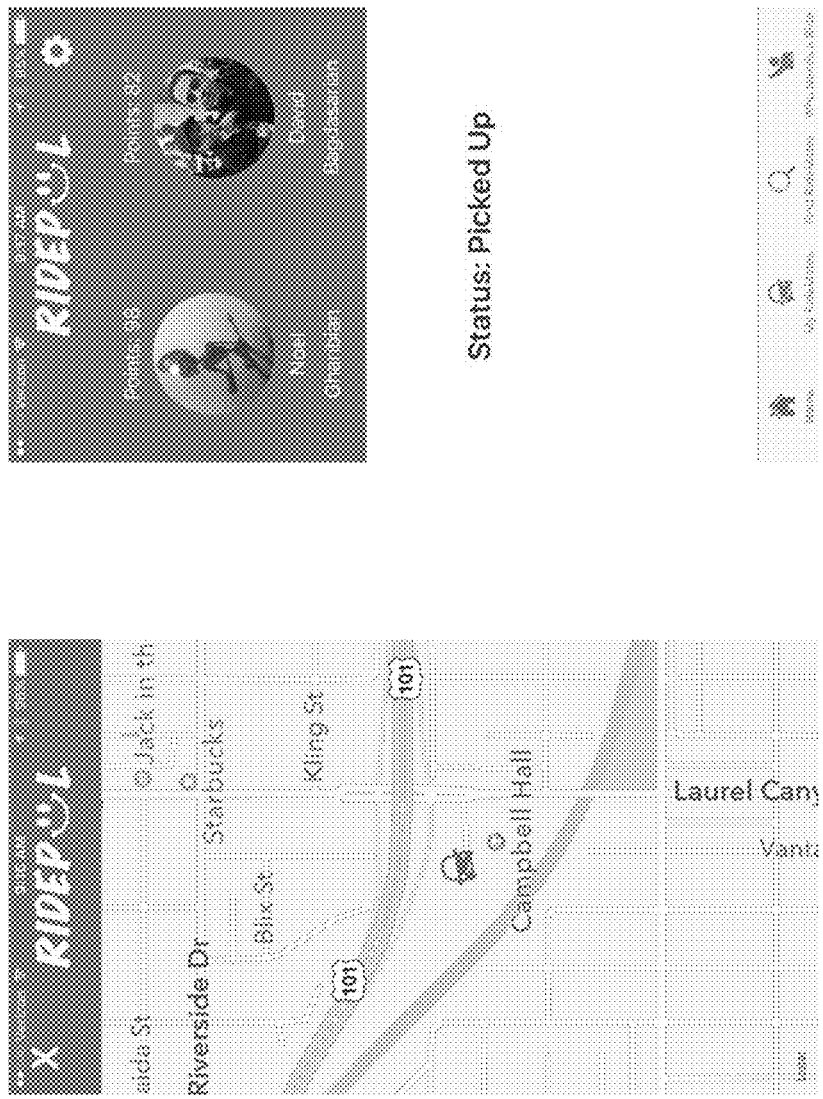
FIG. 10 illustrates a graphical representation of a trusted transportation provider's location along with a status indicator of an transportation request (e.g., individual) being picked up according to embodiments.
Figure 10A:
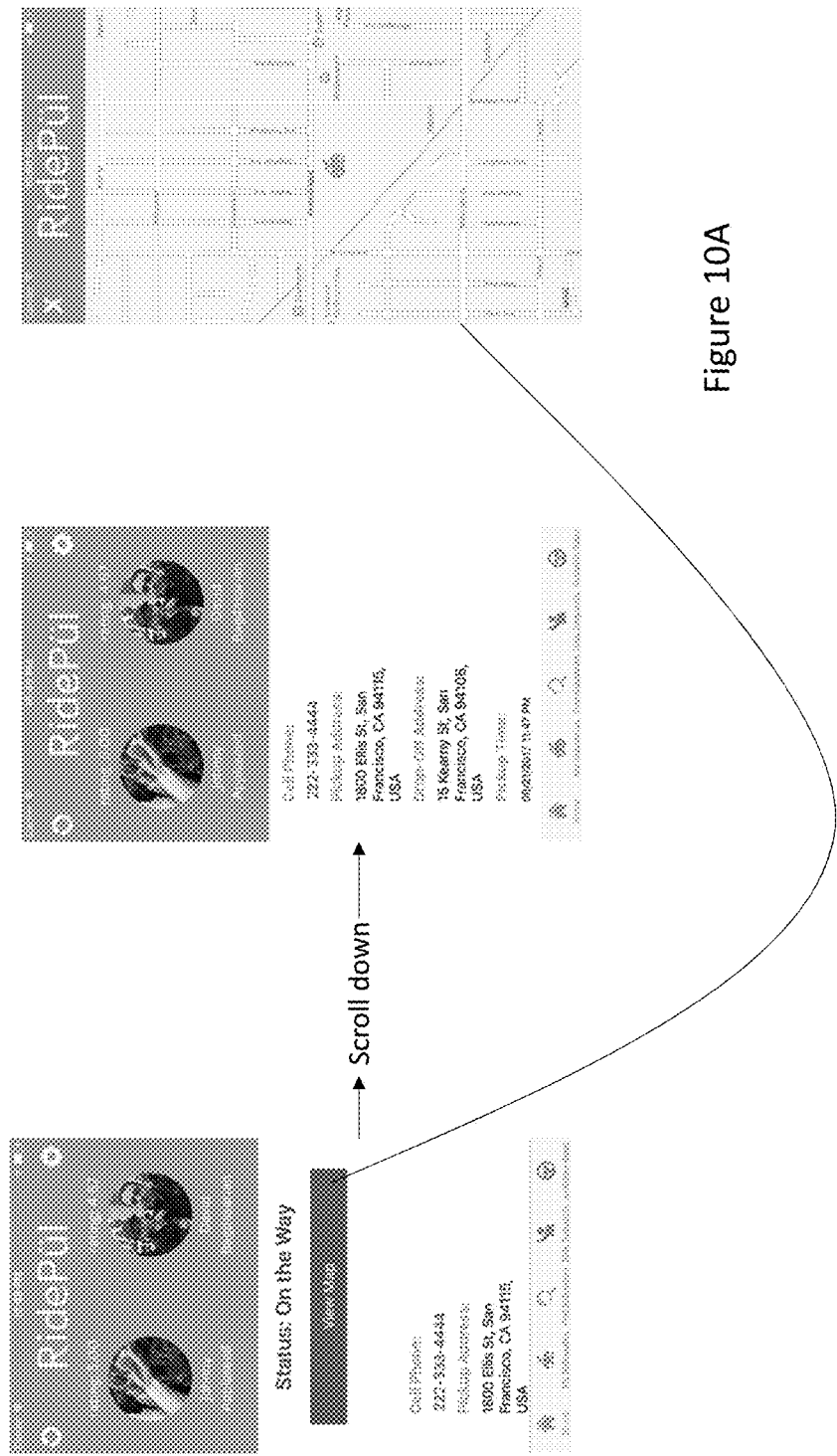
FIG. 10A illustrates an additional embodiment of screen shots of RIDEPUL application software for providing status updates of a transportation provider.
Figure 10B:
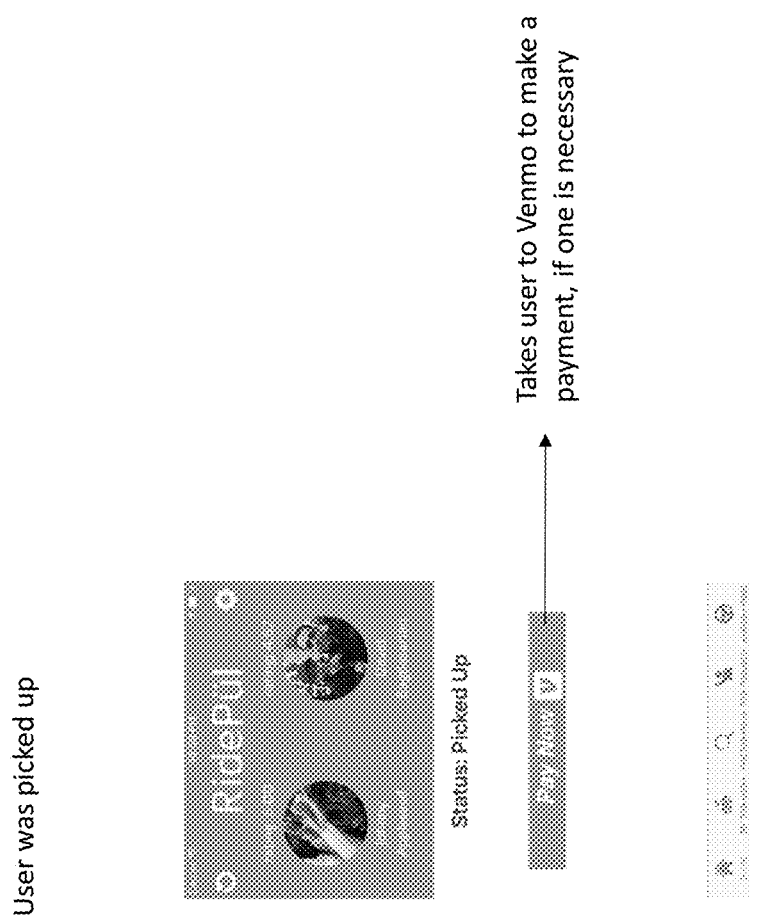
FIG. 10B illustrates status indicator screens of a transportation provider according to embodiments.
Figure 10C:
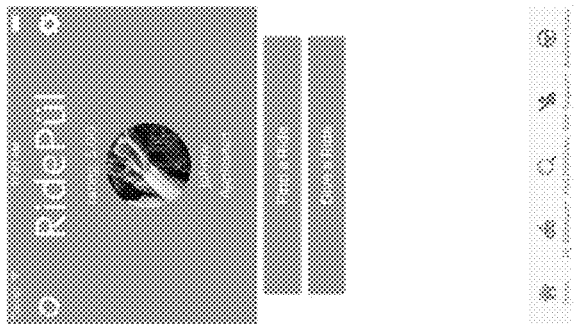
FIG. 10C illustrates a screen shot of a menu to which RIDEPUL application software may return after a transportation requester is dropped off a destination address.

FIG. 10 illustrates a graphical representation of a trusted transportation provider's location along with a status indicator of a transportation request (e.g., individual) being picked up according to embodiments. In embodiments, as a trusted transportation provider may be moving towards or nears a pickup location, a RIDEPUL™ server and/or RIDEPUL™ database (utilizing a RIDEPUL™ API) may provide location updates as to a trusted transportation provider's location and/or status. Illustratively, in embodiment, a trusted transportation provider's mobile communication device may provide location updates of the trusted transportation provider to the RIDEPUL™ server and/or database (utilizing a RIDEPUL™ API) and the RIDEPUL™ sever and/or database (utilizing the RIDEPUL™ API) may provide a location update to a RIDEPUL™ application on a transportation requester's mobile communication device. In embodiments, as is illustrated on a first screen shot of FIG. 10, a map may provide a location update of a selected trusted transportation provider. In embodiments, a selected trusted transportation provider may also provide status updates. FIG. 10A illustrates an additional embodiment of screen shots of RIDEPUL application software for providing status updates of a transportation provider. Illustratively, in embodiments, in a selected trusted transportation provider has picked a transportation requester, a selected trusted transportation provider may transmit or communicate a "completed" or "picked-up" indicator to a RIDEPUL™ server and/or database, which in turn may transmit or communicate a "picked-up" indicator to a RIDEPUL™ application on a requester's mobile communication device. In embodiments, as is illustrated in a second screen shot of FIG. 10, David Bagdasarian has picked up Noel (or an individual related to Noel), and a communicated status indicator of "Picked Up" is displayed as a current status. In embodiments, as is illustrated in a screen shot of FIG. 10B, a transportation provider has provided a status of "Picked Up." In embodiments, RIDEPUL application software may generate a screen shot to allow a transportation requester to make a payment to a transportation provider. In embodiments, as is illustrated in FIG. 10B, a screen may include a selection button and/or icon to make a payment to a third party payment application (e.g., Venmo). In embodiments, RIDEPUL application software on a mobile device may communicate input payment information directly to a third party payment application server and/or indirectly to a third party payment application server (via a RIDEPUL application server). In embodiments, a third party payment application software API may be coupled and/or integrated with RIDEPUL application server. FIG. 10C illustrates a screen shot of a menu to which RIDEPUL application software may return after a transportation requester is dropped off a destination address.

Figure 11:
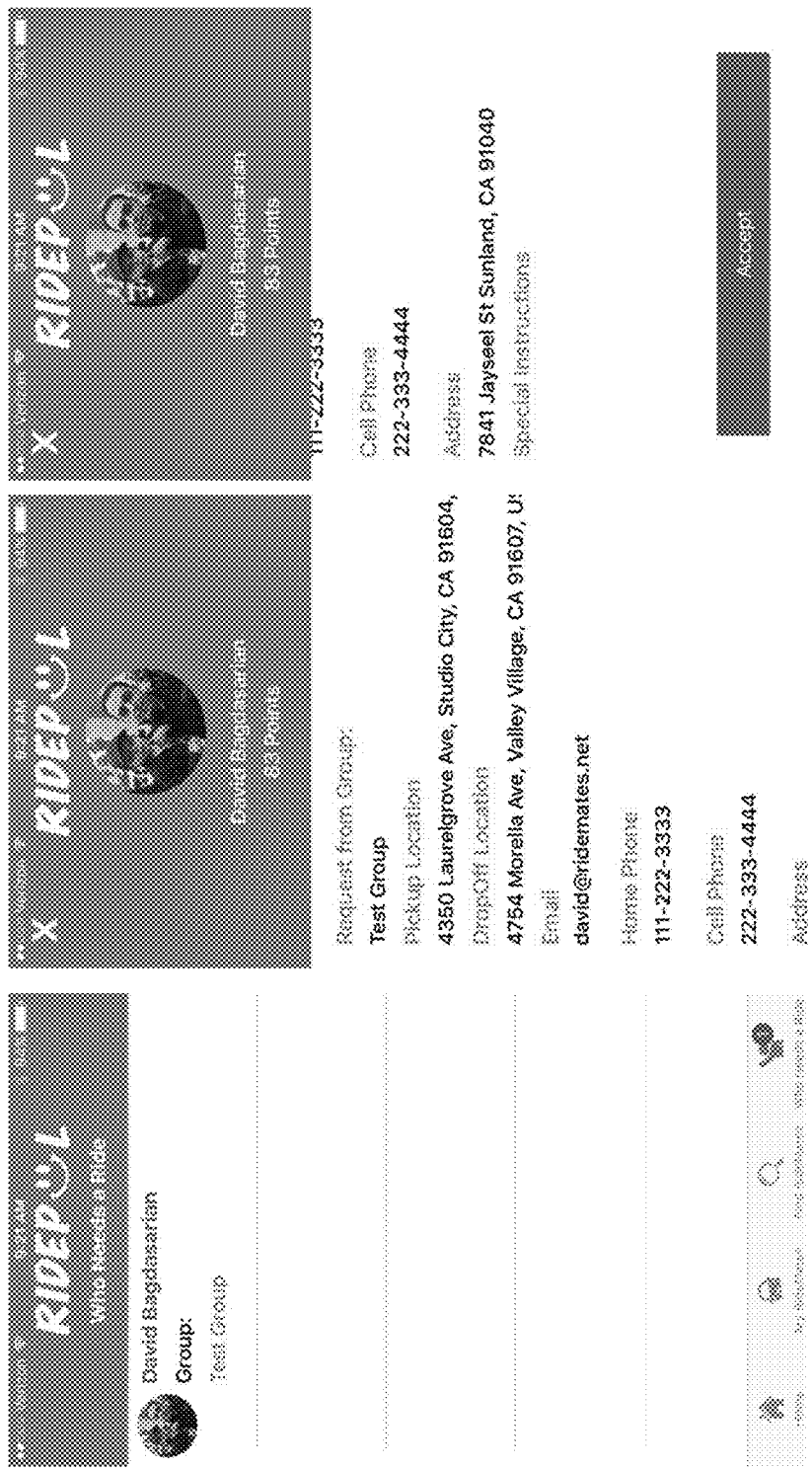
FIG. 11 illustrates screen shots of a transportation request from a trusted transportation provider's perspective and/or point-of-view according to embodiments.
Figure 11A:
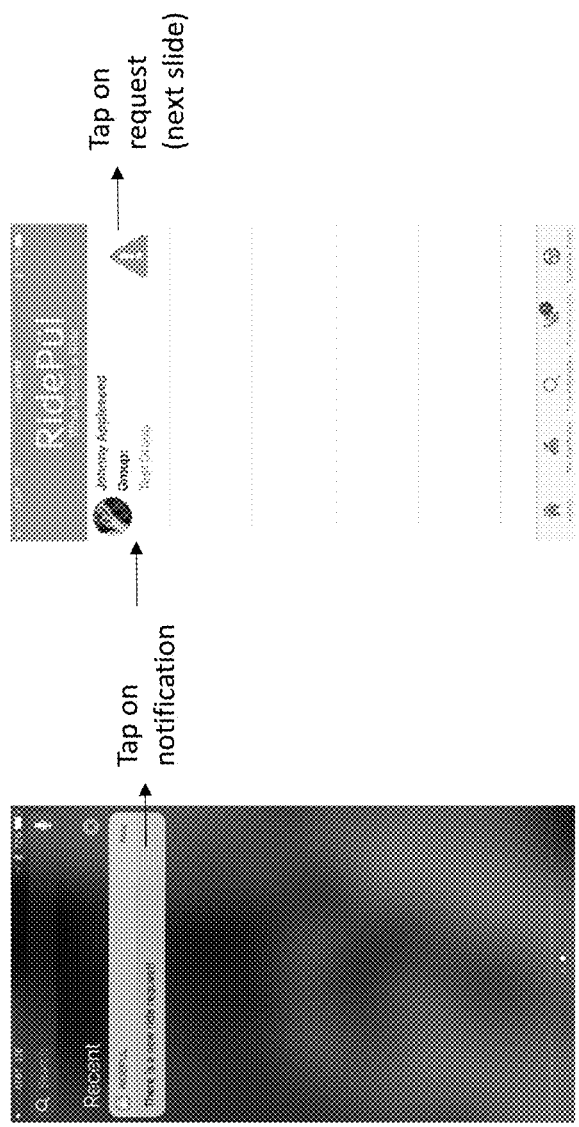
FIG. 11A illustrates another embodiments, where a transportation provider receives a transportation request to provide a ride.
Figure 11B:
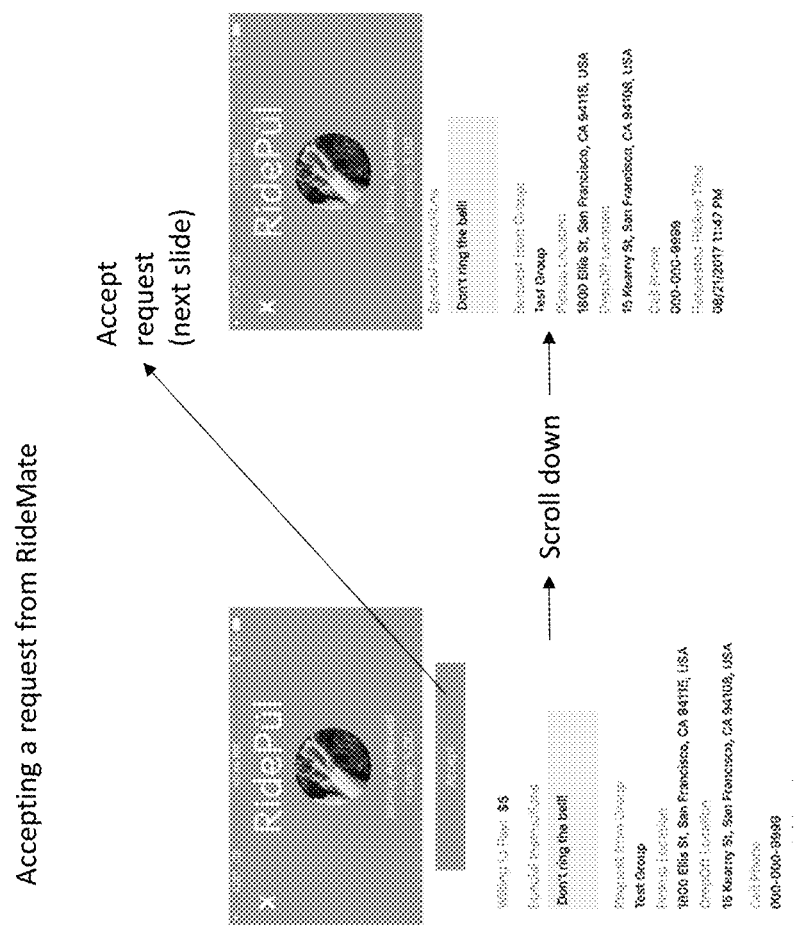

FIG. 11 illustrates screen shots of a transportation request from a trusted transportation provider's perspective and/or point-of-view according to embodiments. In embodiments, after a trusted transportation provider has initiated a RIDEPUL™ software application on its mobile communication device, a RIDEPUL™ server and/or database (utilizing a RIDEPUL™ API) may communicate transportation requests made by individuals who are part of groups to which a transportation provider belongs. A received trusted transportation request comprises, for example, requester group information, requester pickup information, a requester drop off location, requester email address, requester phone number and/or any special instructions from requester. As is illustrated by a first screen shot in FIG. 11, a transportation request is received by a trusted transportation provider. As is illustrated by a second and third screen shot in FIG. 11, transportation requester information may be displayed to a trusted transportation provider and an option is presented for a trusted transportation provider to accept a transportation request. FIG. 11A illustrates another embodiments, where a transportation provider receives a transportation request to provide a ride. FIG. 11A also illustrates a flow diagram of how a transportation provider identifies a transportation request. In embodiments, a computing device of a transportation provider receives a transportation request, which is provided via a notification on a provider's computing device. In embodiments, an individual may select a notification by tapping on it and RIDEPUL application software and/or a RIDEPUL application server may communicate a group and individual who generated the received transportation request. In embodiments, FIG. 11B illustrates screen shots of a transportation provider accepting a transportation request from a transportation provider. In embodiments, RIDEPUL application software generates a screen identifying amount requester willing to pay, time of transportation request, pickup address and/or drop off address, and/or mobile telephone number.

Figure 12:
FIG. 12 illustrates screen shots from a transportation providers point of view for providing status during a transportation transaction according to an embodiment.
Figure 12A:
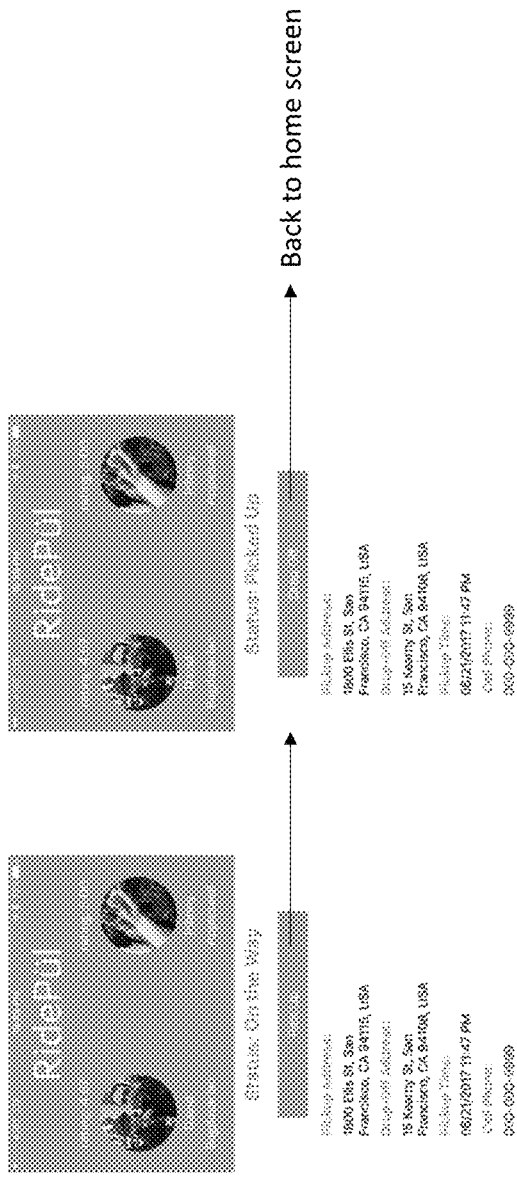
FIG. 12A illustrates an additional embodiment of a trusted transportation provider's mobile communication device displaying status indicators for requested transportation as the transportation provider's vehicle is moving towards the destination address.

FIG. 12 illustrates screen shots from a transportation provider's point of view for providing status during a transportation transaction according to embodiments. In embodiments, a trusted transportation provider may accept a transportation request and be assigned the transportation request. In embodiments, a trusted transportation provider may communicate, via a mobile communications device, an assigned and/or accepted status to a RIDEPUL™ server and/or database (utilizing a RIDEPUL™ API) and a RIDEPUL™ server and/or database (utilizing a RIDEPUL™ API) may communicate a request to the requester's mobile communication device. As is illustrated in a first screen shot of FIG. 12, a trusted transportation provider may accept a transportation request and may be assigned. As is illustrated in a second and third screen shot of FIG. 12, a trusted transportation provider's mobile communication device displays status indicators of a transportation provided moving or traveling to a transportation requester's pickup location (e.g, "On the Way" and "Picked Up.") FIG. 12A illustrates an additional embodiment of a trusted transportation provider's mobile communication device displaying status indicators for requested transportation as the transportation provider's vehicle is moving towards the destination address (e.g, "On the Way" and "Picked Up.")

In embodiments, a transportation requester may close the transportation transaction loop if the transportation provider forgets to click "drop off" at the end of the transportation or ride. In embodiments, a transportation requestor may click "I was dropped off" on his or her mobile communications device to complete the transportation transaction.

Figure 13A:
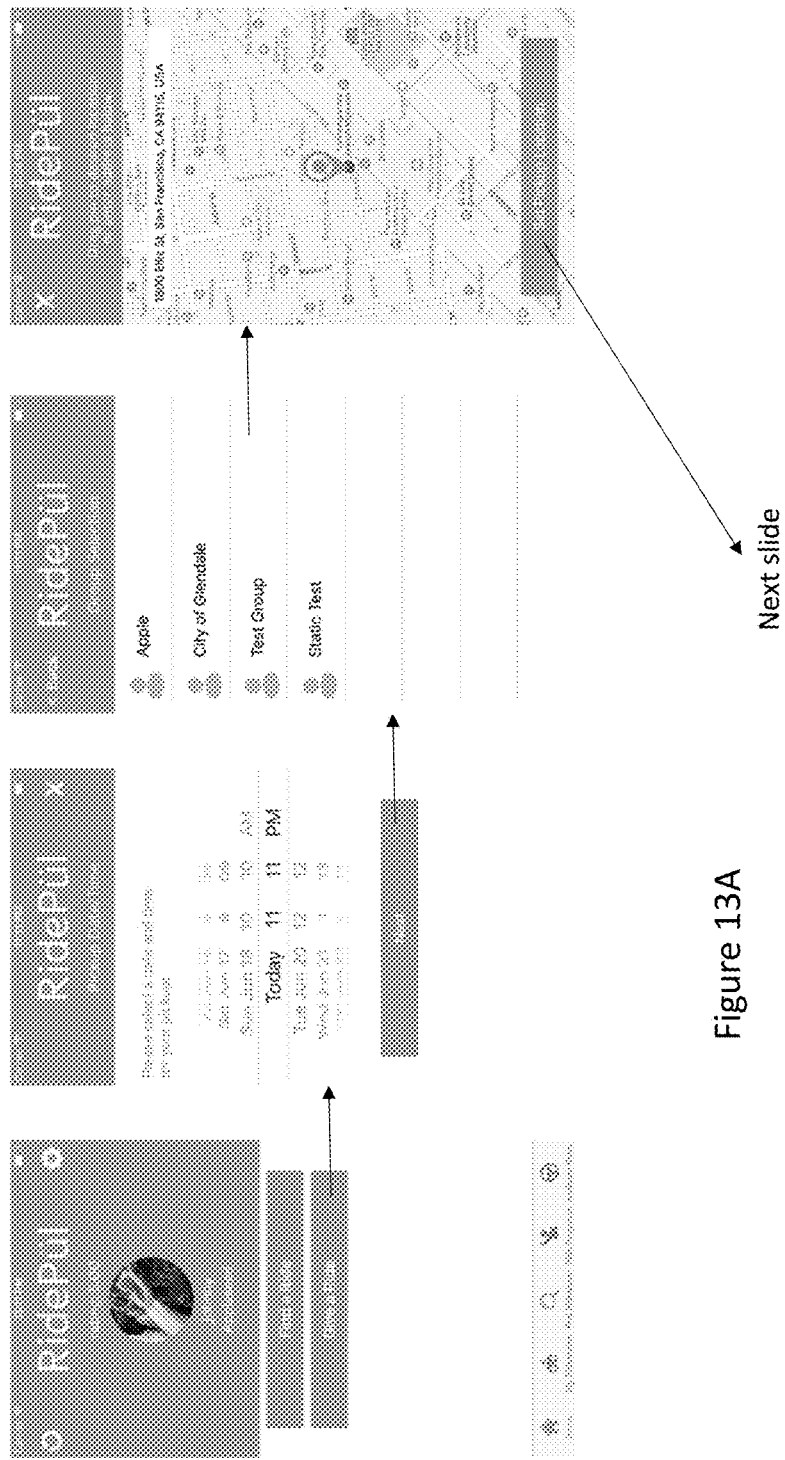
FIG. 13A illustrates a software process for a transportation provider offering transportation to individuals without individuals first requesting transportation according to embodiments.
Figure 13B:
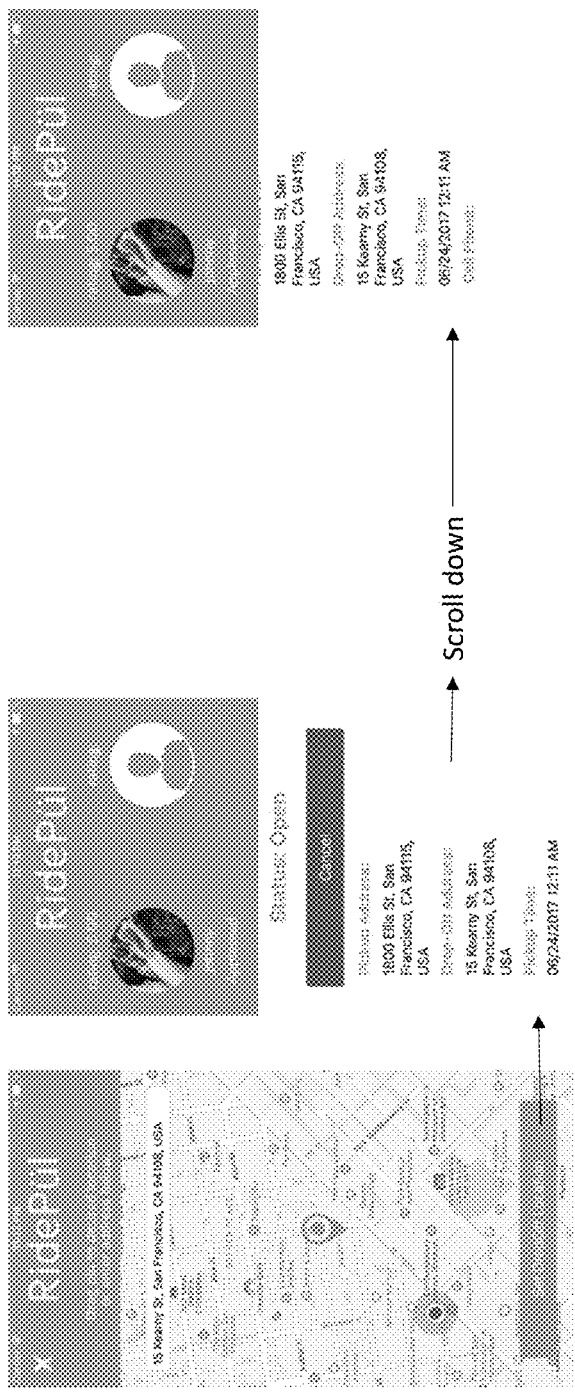
FIG. 13B illustrates a RIDEPUL application software input screen automatically generated (far left panel) which requests destination area and/or destination address information.

FIG. 13A illustrates a software process for a transportation provider offering transportation to individuals without individuals first requesting transportation according to embodiments. In embodiments, a transportation provider may login into RIDEPUL application software and select a "Provide a Ride" option. In embodiments, RIDEPUL application software may automatically request transportation providing information from the transportation provider (e.g., time of transportation being provided and offered to others, groups transportation is being offered to, a pickup area and/or address and a destination area and/or address). FIG. 13A illustrates RIDEPUL application software information screens automatically requesting this information from a transportation provider making a transportation offer. When a transportation provider is providing a unsolicited transportation offer, a destination area and/or pickup area may be utilized rather than an exact address in order to provide general areas to which a transportation provider is driving and/or moving. FIG. 13B illustrates a RIDEPUL application software input screen automatically generated (far left panel) which requests destination area and/or destination address information. In embodiments, RIDEPUL application software may generate a transportation offer and communicate a generated transportation offer to a RIDEPUL application server. In embodiments, RIDEPUL application server may generate a corresponding server transportation offer and may communicate a server transportation offer to mobile devices (and thus users) which are a member of a group selected by the transportation provider when making the transportation offer. The center and right panel (screen shots) show screens identifying, at the transportation provider's computing device, that a transportation has been offered and sent to a number of members in an established group.

FIG. 13C illustrates status screens in a process of a transportation provider generating a transportation offer and one of a selected group RIDEMATES accepting the offer. In embodiments, messages may be communicated, in both ways, from the transportation offeror mobile computing device through at least a RIDEPUL application server. For example, a left most screen shows a status of a transportation offer being accepted and/or assigned, a center screen shows a transportation offer status of "On the Way" and a right most screen shows a transportation offer status of "Picked Up."

Figure 13D:
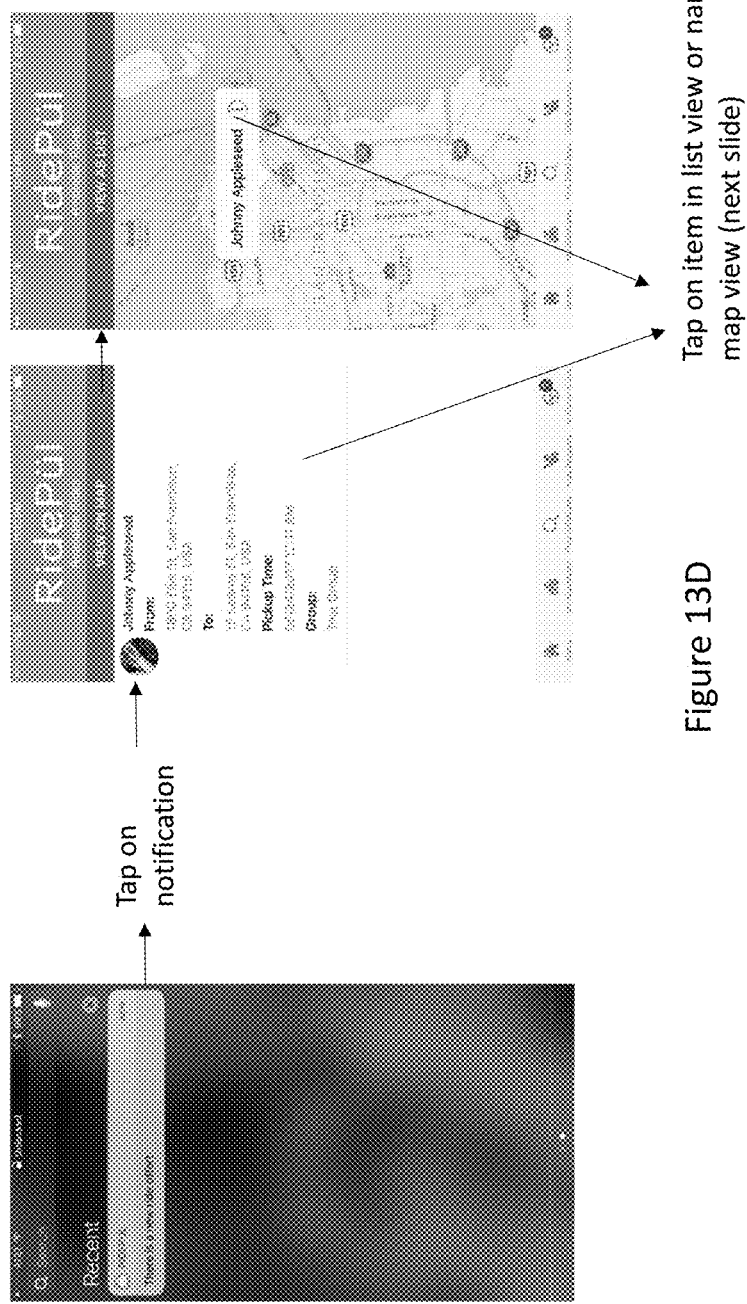
FIG. 13D illustrates status screens for a process where a group member has generated a transportation offer and has transmitted and/or communicated the transportation offer via RIDEPUL application software and/or a RIDEPUL application server.

FIG. 13D illustrates status screens for a process where a group member has generated a transportation offer and has transmitted and/or communicated the transportation offer via RIDEPUL application software and/or a RIDEPUL application server. FIG. 13D illustrates a RIDEMATE or group member receiving an unsolicited transportation offer from a transportation provider. In embodiments, a RIDEPUL application server, after receiving a transportation offer from a transportation provider, may generate a trusted transportation offer from and communicate it to group members associated with the trusted transportation provider. A right most panel shows a computing device screen that has received, in the form of a notification (e.g., a SMS notification), a trusted transportation offer. If a user selects the received notification (by tapping on the notification), RIDEPUL application software and/or a RIDEPUL application server may generate display screens (such as shown in center panel and/or right panel), identifying a trusted transportation provider who generated the trusted transportation offer, details of the trusted transportation offer and/or a location of the trusted transportation provider.

Figure 13E:
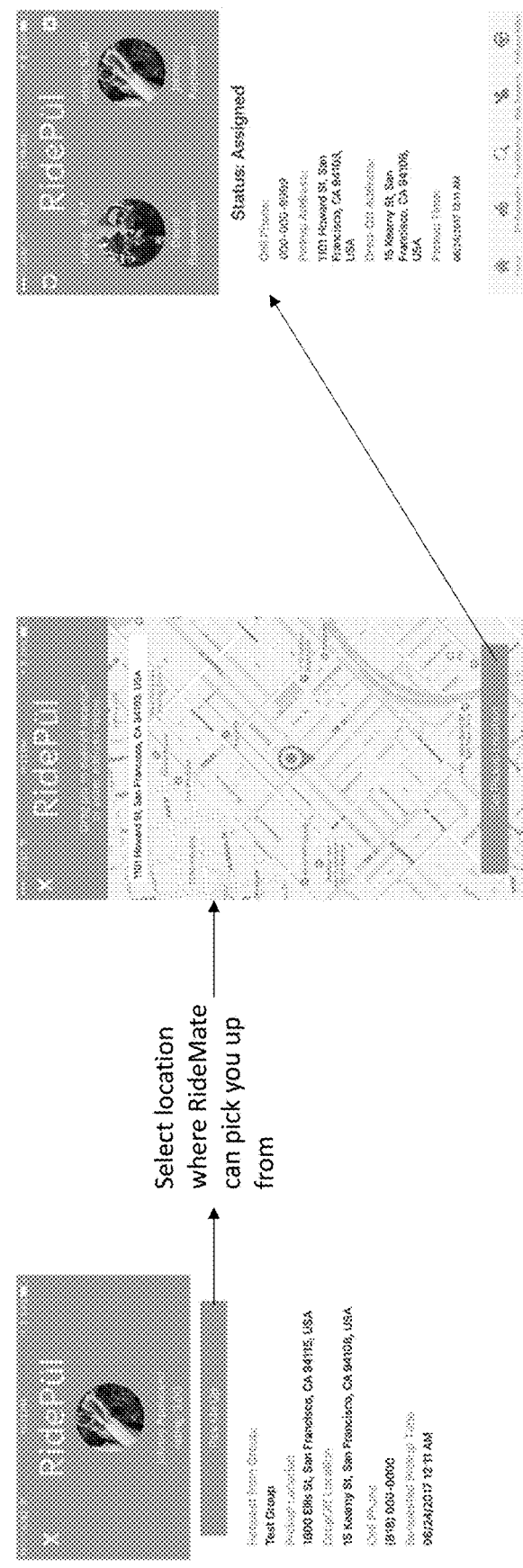
FIG. 13E illustrates acceptance, by a Ridemate, in a group, of a trusted transportation offer from a trusted transportation provider.
Figure 13F:
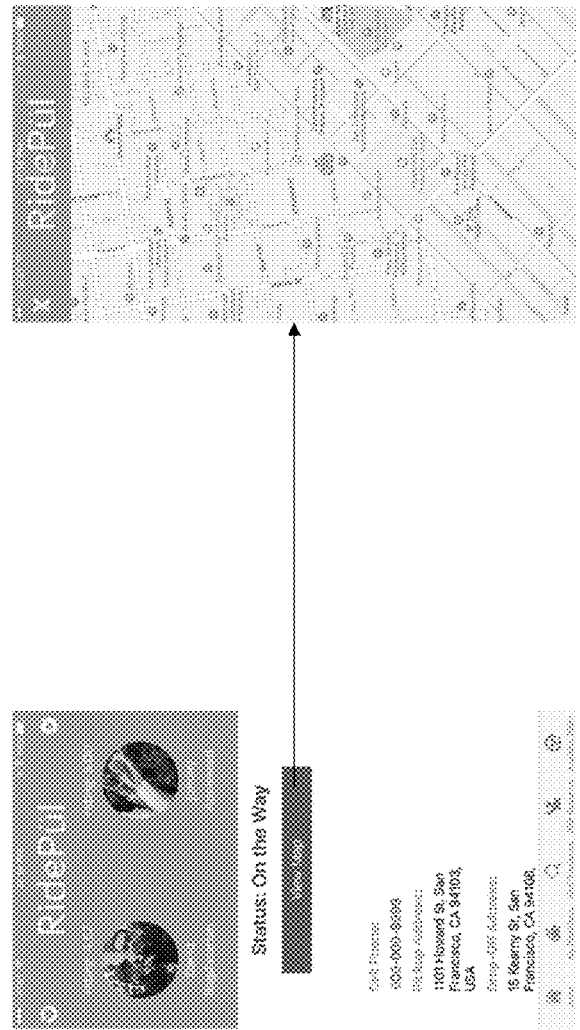
FIG. 13F illustrates status indicator screens communicated by the RIDEPUL application server to the mobile device of the individual who accepted the trusted transportation offer.

FIG. 13E illustrates acceptance, by a Ridemate, in a group, of a trusted transportation offer from a trusted transportation provider. In embodiments, a group member or Ridemate, may accept a trusted transportation offer (as shown in left most panel of FIG. 13E), and RIDEPUL application software (and/or a RIDEPUL application server) may receive the acceptance, communicate the acceptance to a trusted transportation provide and generate and communicate a map to a computing device of the individual accepting the transportation request so that the individual can input an pickup address where the trusted transportation provider can pick the up from. The computing device executing RIDEPUL application software may communicate this information to the RIDEPUL application server, which in turn communicates an "Assigned" status input screen to the individual accepting the transportation offer (as is illustrated by right most panel in FIG. 13E). FIG. 13F illustrates status indicator screens communicated by the RIDEPUL application server to the mobile device of the individual who accepted the trusted transportation offer. In embodiments, these status indicator screen identify that the trusted transportation provider is "On the Way" and/or also provides a map of the trusted transportation provider's location.

Figure 13G:
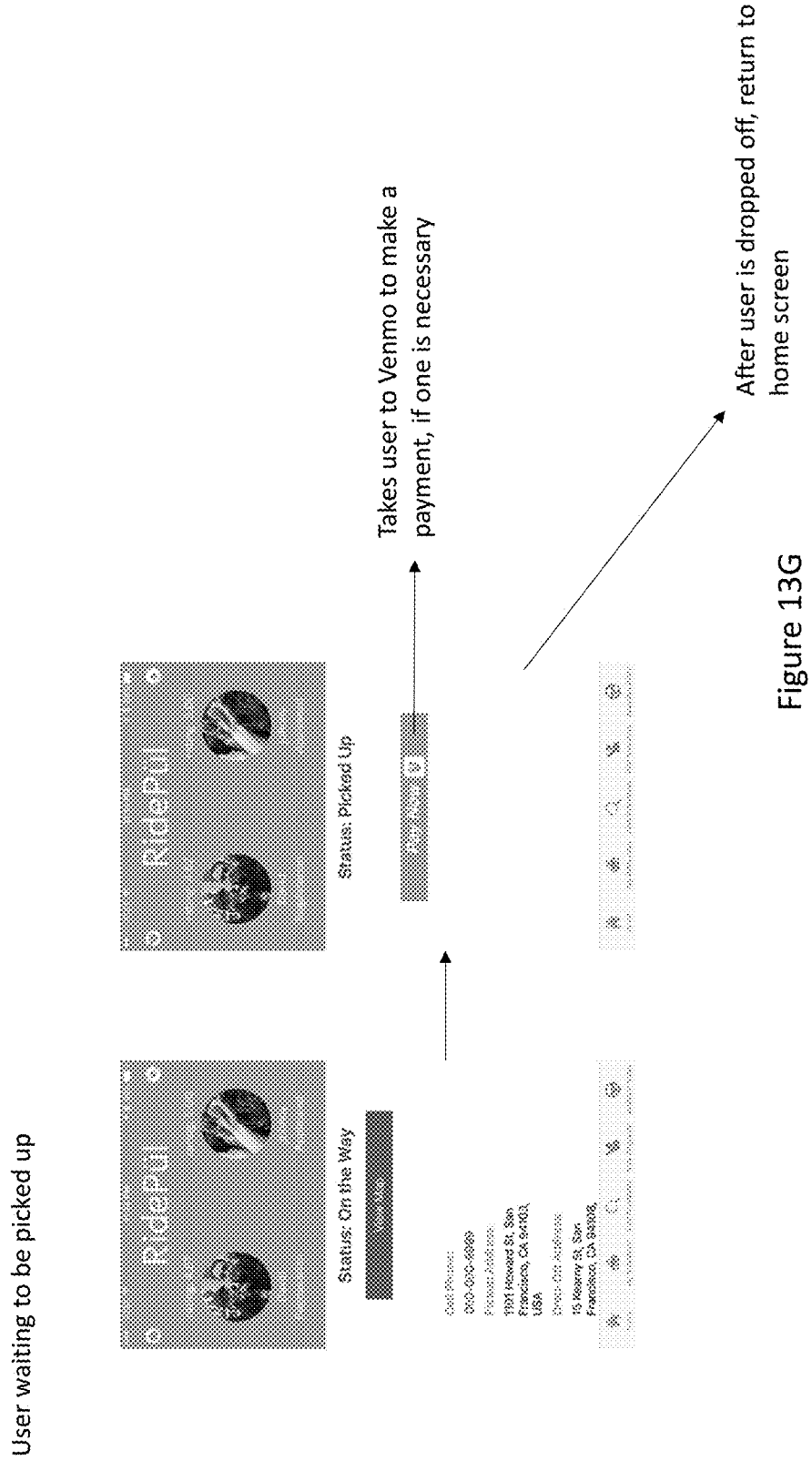
FIG. 13G illustrates a status indicator screen along with a payment option according to embodiments.

FIG. 13G illustrates a status indicator screen along with a payment option according to embodiments. Once an individual who accepted the trusted transportation provider's offer is picked up, a payment screen may be presented to allow the individual to make a payment (if necessary) for the transportation. In embodiments, a right most panel of FIG. 13G illustrates an option to connect to a third party payment provider like Venmo to provide payment for the accepted transportation offer and also illustrates that a user has been picked up. Communication between the mobile device of the individual who accepted the trusted transportation provider's offer, the trusted transportation provider and the third party payment server is coordinated, communicated and/or handled via the RIDEPUL application software and/or the RIDEPUL application server.

Figure 14A:
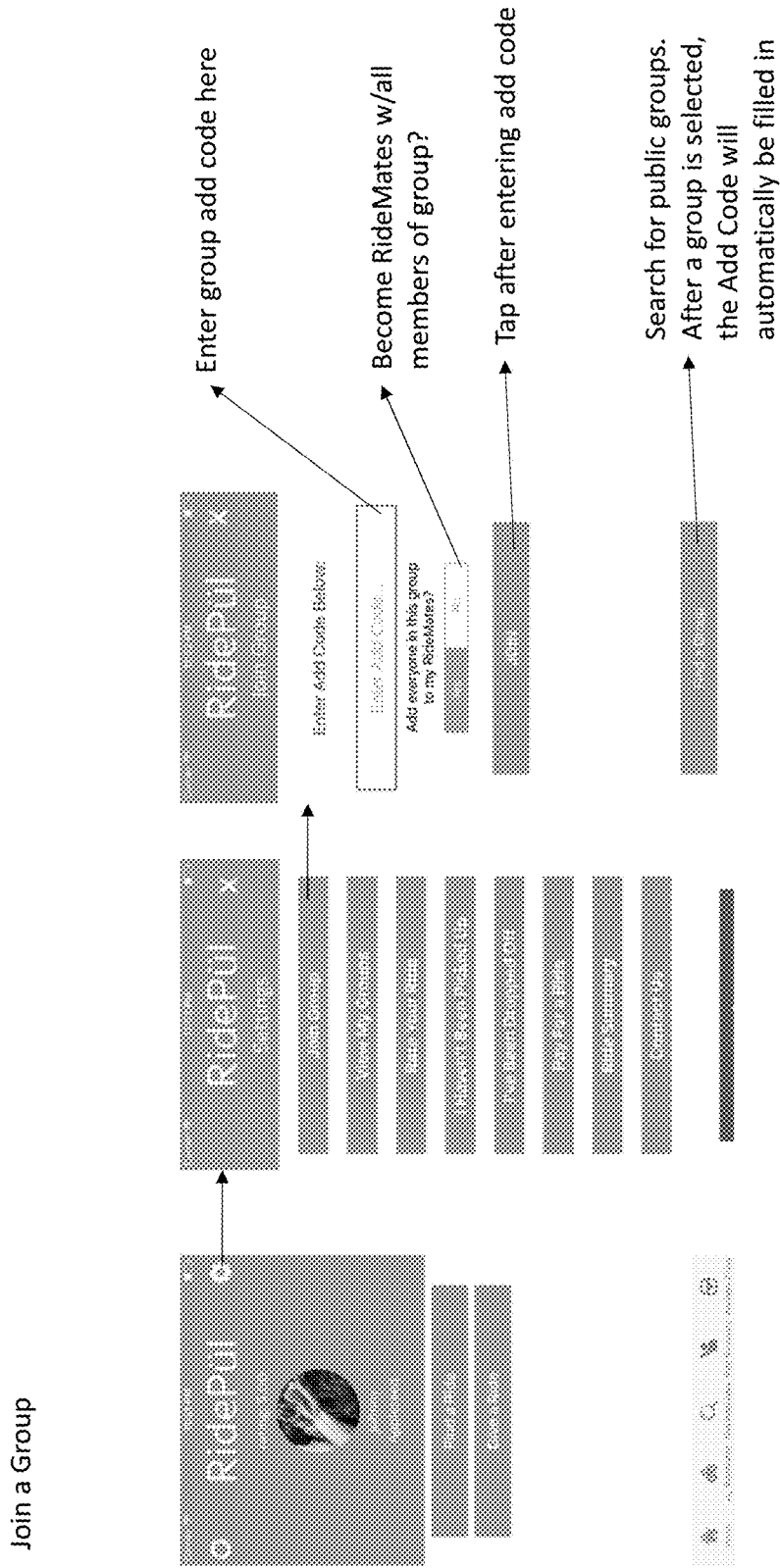
FIG. 14A illustrates input screens in a process for joining existing groups according to embodiments.

In embodiments, a transportation provider and/or a transportation requester may join existing groups that are present in a RIDEPUL software application. FIG. 14A illustrates input screens in a process for joining existing groups according to embodiments. In embodiments, a transportation provider or a transportation requestor may decide to join a group. In embodiments, a RIDEPUL software application may be initiated on a computing device of either a transportation provider or a transportation requester. In embodiments, RIDEPUL application and/or a RIDEPUL application server may communicate an input screen (e.g., as shown in the center panel of FIG. 14A) to allow a transportation provider and/or transportation requester to initiate joining, viewing and/or leaving a group (by selecting "Join a Group" or "Leave a Group" after a registration process has been completed (e.g., when a user or individual has been using the RIDEPUL application software). In response, RIDEPUL application software and/or a RIDEPUL application server may generate and communicate a group join or group view or group modify screen to present the input screen on transportation requester or transportation provider mobile device to allow a user or individual to start and/or initiate these actions. A right most panel of FIG. 14A illustrates a Group Add input screen or Group Search input screen generated by RIDEPUL software application and/or a RIDEPUL application server. For example, an individual or user may enter a group add code being entered to add a group and/or also to select if a user and/or individual would like to become Ridemates with all members a group. In addition, there is an input icon or button to initiate searching for group add cod or searching for public groups. In embodiments, if after presentation of a number of public groups allows a group to be selected, an add group will be automatically filled in.

Figure 14B:
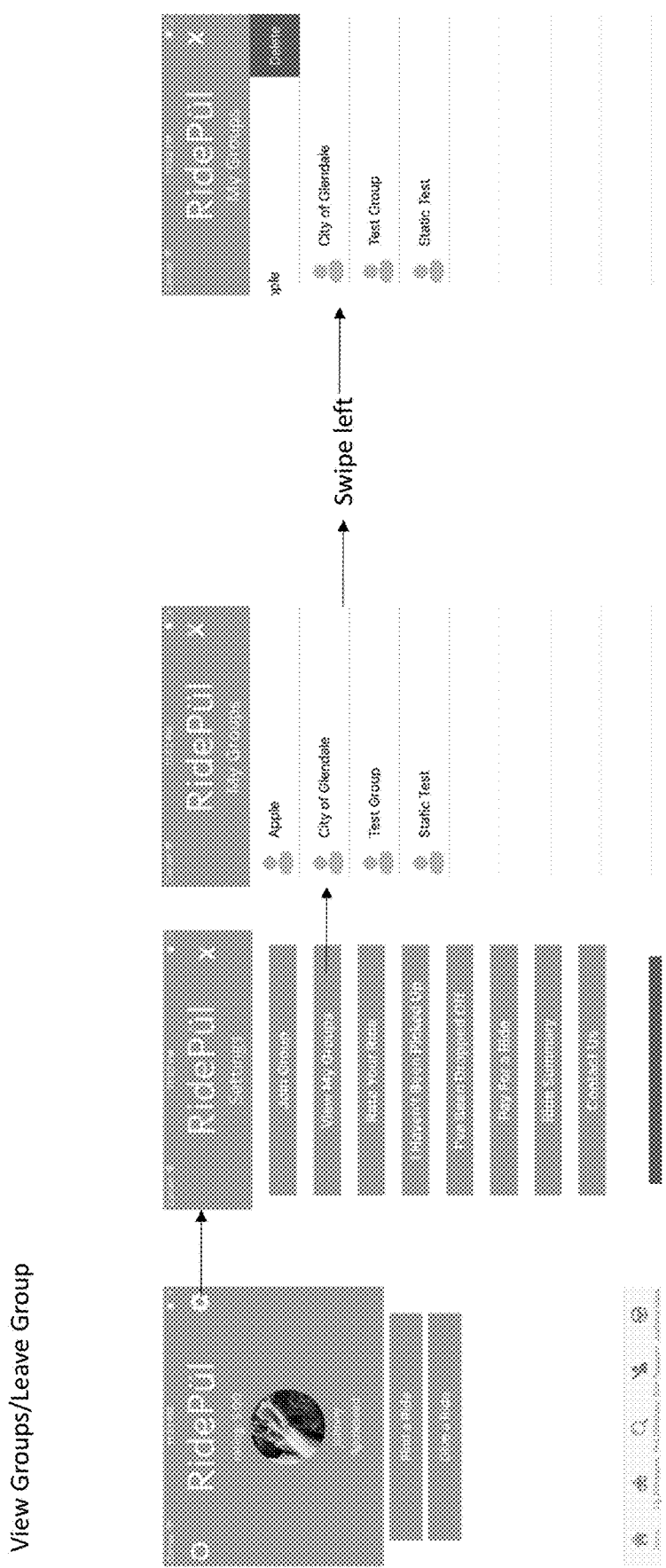
FIG. 14B illustrates viewing and deleting of groups in RIDEPUL application software according to embodiments.

FIG. 14B illustrates viewing and deleting of groups in RIDEPUL application software according to embodiments. In embodiments, a transportation requester and/or a transportation provider may request a View My Groups option in RIDEPUL application software. In embodiments, a RIDEPUL application software and/or a RIDEPUL application server may generate and communicate a list of groups to which the transportation requester and/or transportation provider belongs to a computing device and this may be presented to the transportation requester and a transportation provider as is shown by the third panel in FIG. 14B. In embodiments, a transportation requester and/or transportation provider may request to be deleted from a group (e.g., in embodiments by swiping left on one of a group names in a list of groups to which the requester or provider belongs). A right most panel of FIG. 14B illustrates results of a requester and/or provider selecting to delete an Apple group. In embodiments, RIDEPUL application software may generate a deletion indicator which may be communicated to a RIDEPUL application server and/or database and a record corresponding to linking the transportation requester and/or transportation provider to the Group. In other words, a record for the transportation provider and/or transportation requester may be modified or changed to reflect that the requester and/or provider no longer belongs to a group.

Figure 15A:
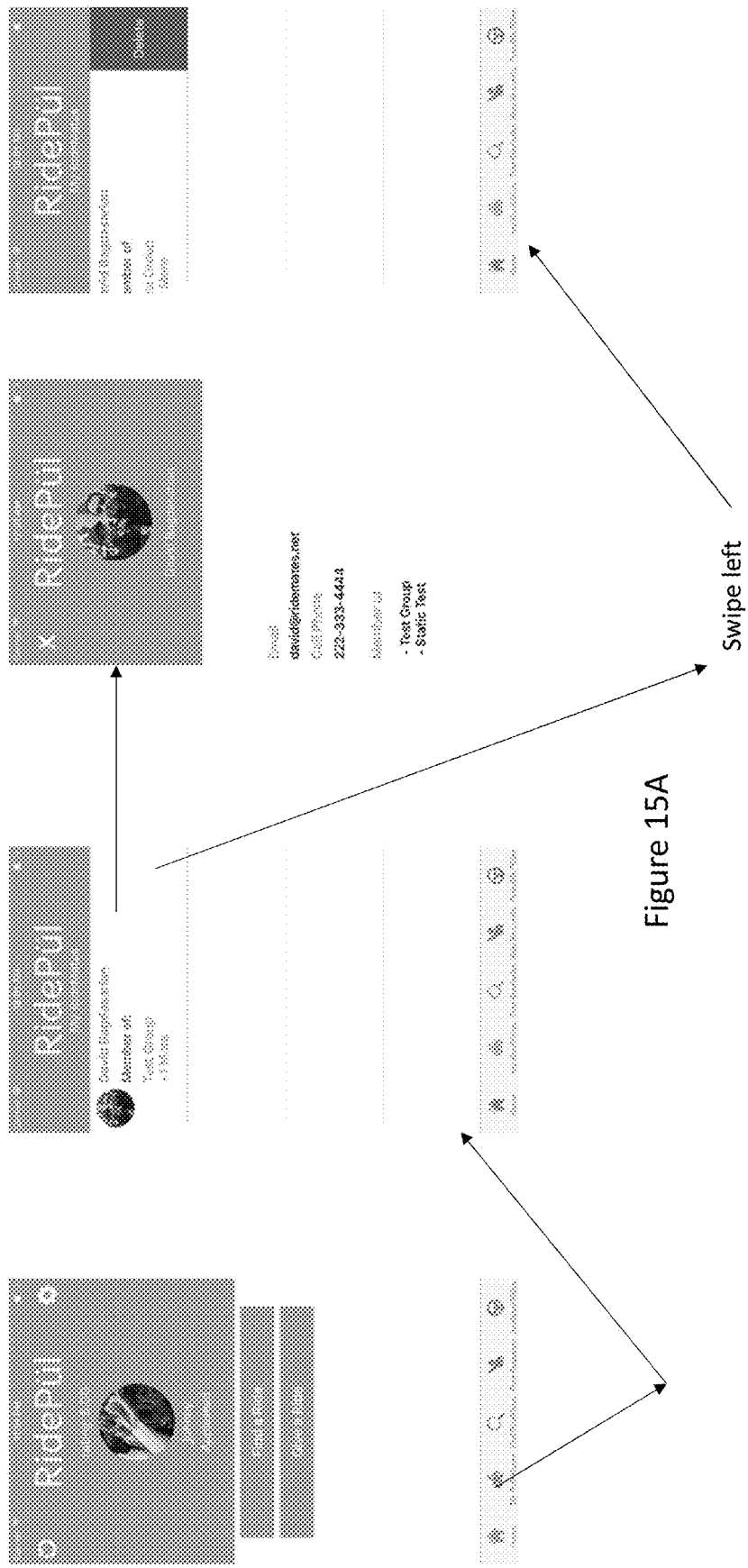
FIG. 15A illustrates viewing and/or removing members of a group according to embodiments.

FIG. 15A illustrates viewing and/or removing members of a group according to embodiments. In embodiments, RIDEPUL application software may generate a screen shot that presents an option (as illustrated in a leftmost panel in FIG. 15A) to view and/or remove group members (e.g., RIDE-MATES). After a transportation requester and/or transportation provider selects a group, RIDEPUL application software and/or a RIDEPUL application server may present a list of group members and/or members (if a name is selected) that may first be viewed and/or later removed. In embodiments, for example, a user may select to remove a group member and/or RIDEMATE by swiping left. In embodiments, RIDEPUL application software may generate a deletion indicator which may be communicated to a RIDEPUL application server and/or database and a record corresponding to linking the transportation requester and/or transportation provider to the Group. In other words, a record for the transportation provider and/or transportation requester may be modified or changed to reflect that the requester and/or provider no longer belongs to a group.

Figure 15B:
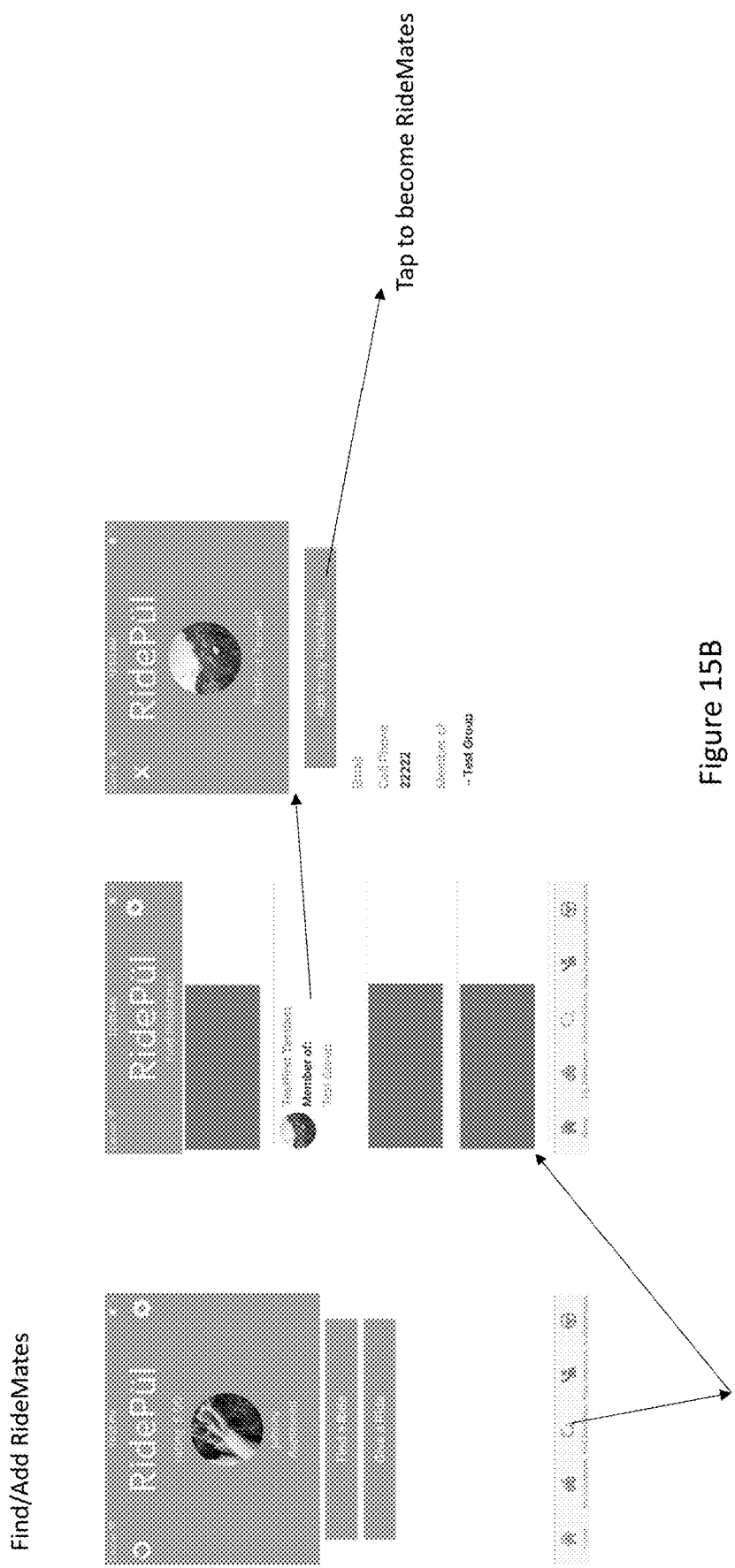
FIG. 15B illustrates finding and/or adding group members according to an embodiments.

FIG. 15B illustrates finding and/or adding group members according to an embodiments. In embodiments, RIDE-MATE application software may be initiated and a transportation requester and/or transportation provider may select to find and/or add group members and/or RIDEMATES to an existing group. In embodiments, in response, RIDE-MATE application software and/or a RIDEMATE application sever may generate a list of potential members and present the list to the requester and/or provider, as is illustrated in the second panel of FIG. 15B. In embodiments, a transportation provider or a transportation provider may become a group member and/or Ridemates by selecting that individual and sending and establishing the indicator. In embodiments, RIDEPUL application software may generate an addition indicator which may be communicated to a RIDEPUL application server and/or database and a record corresponding to linking the transportation requester and/or transportation provider to the Group. In other words, a record for the transportation provider and/or transportation requester may be modified or changed to reflect that the requester and/or provider belongs to a group and/or is a Ridemate.

Figure 16B:
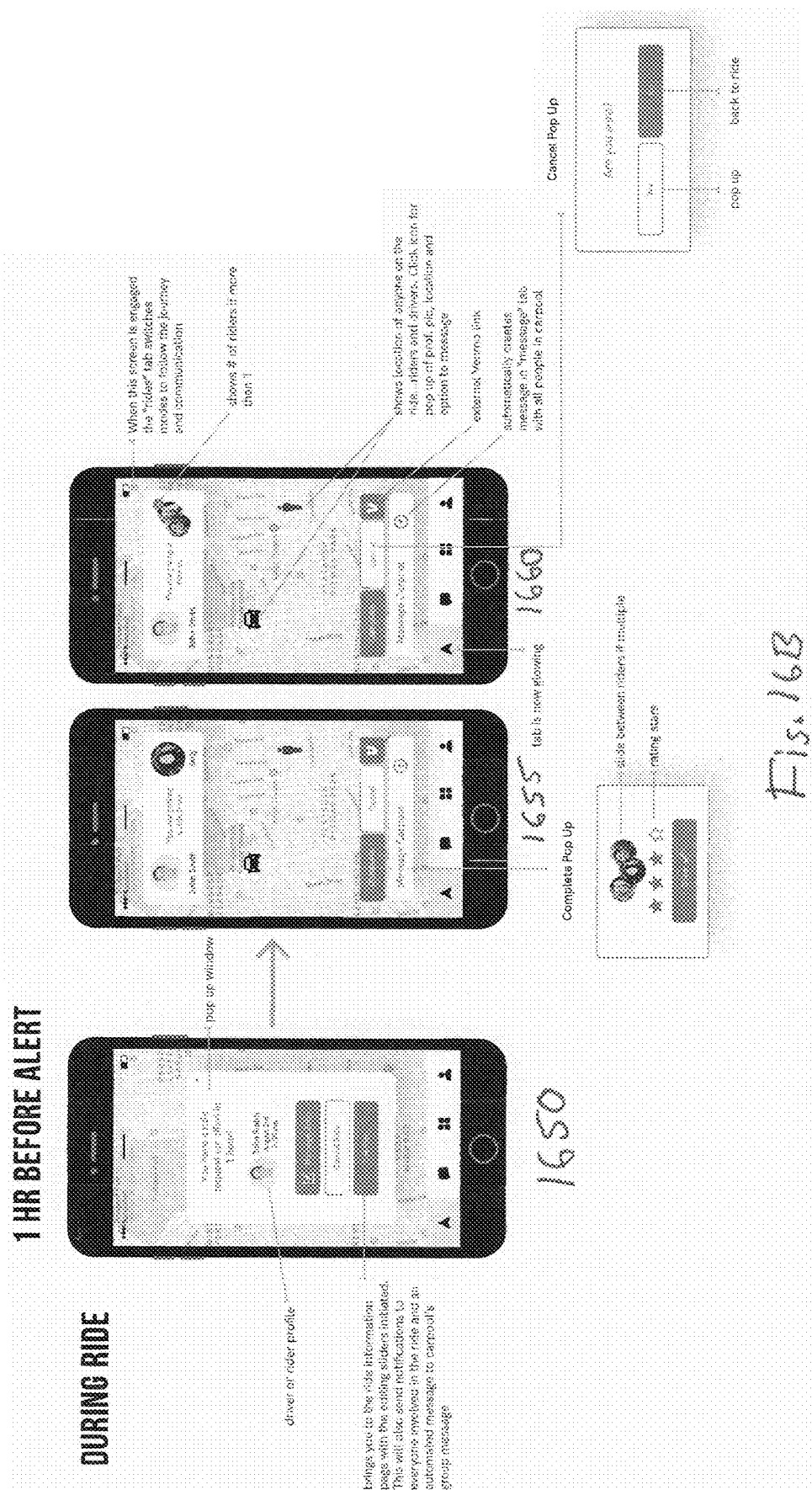
FIG. 16B illustrates a menu item or screen in a RIDEPUL software application when users are either riding with a trusted transportation provider or were the transportation requester.

FIG. 16A illustrates screen shots of a trusted transportation requesting and providing (e.g., RIDEPUL) system according to embodiments. Reference number 1605 illustrates a main screen for a RIDEPUL software application. In embodiments, a RIDEPUL software application user may initiate or execute the software and may 1) determine what groups they are part of; 2) what trips they have taken and/or have provided; 3) request rides from trusted transportation providers and/or 4) may offer rides as a trusted transportation provider. Reference number 1620 illustrates input screens in a RIDEPUL software application for requesting rides from trusted transportation providers where the user inputs a pickup location, a destination location, a requested time, how many seats are needed, a pickup radius, and/or whether they will pitch in for gas money. Reference number 1625 illustrates input screens or menus in a RIDEPUL software application for providing rides where a trusted transportation provider identifies where they are leaving from, a pickup radius, a destination address, a drop off radius, how many seats are available and/or whether or not the provider would like gas money. Reference number 1610 illustrates input screens or menus in a RIDEPUL software application for when a provider and/or a requester accepts a ride request. Illustratively, in embodiments, reference number 1610 illustrates the screens or menus in the RIDEPUL software application for both requesters and providers that provides information about the requester and/or provider to the other party before the ride is accepted (this may include a name, an image, a rating, links to prior reviews. Reference number 1610 further illustrates a ride accepted screen where the user can add to their calendar or see their other rides. Reference number 1615 illustrates input screens or menus in a RIDEPUL software application for when after a ride is accepted where the user can see the rides that are upcoming or that have been taken and further shows information screens on the rider and/or provider (images, names, ratings, etc.) that a user can select for more information about the ride itself or the provider/requester. FIG. 16B illustrates a menu item or screen in a RIDEPUL software application when users are either riding with a trusted transportation provider or were the transportation requester. Reference number 1650 illustrates a pop-up screen that is presented in a RIDEPUL software application a preset time (e.g., 1 hour) before the ride, where you can edit the parameters or particulars (e.g., time, place, number of people, etc.) for the requested ride, cancel the ride and/or message the driver. Reference number 1655 illustrates a menu or pop-up screen in a RIDEPUL software application that a requester is part of a ride and allows for communications between multiple riders within the carpool themselves and/or with the transportation provider as well as providing a rating for the provider. Reference number 1660 also illustrates a menu or pop-up screen in a RIDEPUL software application with a Venmo link for payment, a button to cancel pop-ups in the application, a message link to allow messaging between the transportation requesters themselves and/or the transportation providers, a location of the current ride and how it is progressing through the ride (e.g., on a map display and/or within text), as well as a display or menu item providing information about the trusted transportation provider and the one or more other transportation requesters.

In embodiments, a computer-implemented method for matching transportation providers with transportation requesters may include creating, via input from a computing device, a trusted group of two or more transportation providers, the trusted group of two or more transportation providers being verified through an authentication process; storing the created trusted group of transportation providers in a memory of the computing device; displaying, on a screen of the computing device, individual transportation providers in the trusted group of two or more transportation providers to transportation providers; receiving input, via a new transportation provider computing device, a request for a new trusted transportation provider to join the trusted group of two or more transportation providers; verifying characteristics of the new transportation provider by comparing the characteristics of the new transportation provider versus characteristics of other transportation providers in the trusted group of two or more transportation providers; and adding the new transportation provider to the trusted group of two or more transportation providers if the new transportation provider is verified.

In embodiments, the authentication process may communicate with a remote server or computing device to verify each of the trusted group of two or more transportation providers or the authentication process may communicate with computing devices associated with existing trusted transportation providers in the trusted group of two or more transportation providers to verify authenticity of the new transportation provider. In embodiments, verifying the characteristics of the new transportation provider comprises verifying that the new trusted transportation provider has a common address with other trusted transportation providers in the trusted group of two or more transportation providers or that the new trusted transportation provider has a common group affiliation with the other transportation providers in the trusted group of two or more transportation providers.

A computer-implemented method for matching transportation providers with transportation requesters includes receiving, from a requester computing device, a transportation request to transport a ride requester, the transportation request being for a trusted transportation provider and the transportation request including a requested pickup time, a pickup location and a destination location, the trusted transportation provider being an individual who has an established verified relationship with the ride requester; retrieving computing device transmission parameters for one or more trusted transportation providers from a database on a computing device; communicating, to one or more trusted provider computing devices, the transportation request based, at least in part, on the retrieved computing device transmission parameters; receiving, from the one or more trusted provider computing devices, one or more acceptances of the transportation request; identifying a selected trusted transportation provider, from the one or more acceptances of the transportation request by the one or more trusted provider computing devices; and communicating the identification as the selected trusted transportation provider, to a selected trusted transportation computing device associated with the selected trusted transportation provider. In embodiments, the computer-implemented method further includes determining a pickup time for the ride requester by the selected trusted transportation provider; and communicating the pickup time and the selected trusted transportation provider to the requester computing device.

The computer-implemented method further includes receiving, from the requester computing device, an acceptance of the selected trusted transportation provider and the pickup time; and communicating the acceptance of the selected trusted transportation provider and the pickup time to the selected trusted transportation provider computing device. In embodiments, identifying the selected transportation provider includes ranking the one or more trusted transportation providers who accepted the transportation request and selecting a highest ranked trusted transportation provider after the ranking process. In embodiments, the computer-implemented method further includes displaying a map of an area near a ride requester on a display of a ride requester's computing device; and wherein the pickup location or the destination location is selected via receiving an input of a location on the displayed map. In embodiments, the computer-implemented method further includes retrieving one or more trusted transportation provider groups from a database server; communicating the one or more trusted transportation provider groups to the requester computing device to be shown on a display of the requester computing device. In embodiments, the computer-implemented method further includes a selection of a trusted transportation group to receive the transportation request.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

The invention claimed is:

1. A computer-implemented method for matching transportation providers with transportation requesters, comprising:
   receiving, from a requester computing device, a transportation request to transport a ride requester, the transportation request being for a trusted transportation provider and the transportation request including a requested pickup time, a pickup location and a destination location, the trusted transportation provider being an individual who has an established verified relationship with the ride requester;
   before receiving the transportation request from the transportation requester, establishing the group of one or more trusted transportation providers through communication between the trusted transportation providers and verifying of the one or more trusted transportation providers, and wherein the one or more transportation providers comprises two or more trusted transportation providers
   retrieving computing device transmission parameters for one or more trusted transportation providers from a database on a computing device;
   communicating, to one or more trusted provider computing devices, the transportation request based, at least in part, on the retrieved computing device transmission parameters;
   receiving, from the one or more trusted provider computing devices, one or more acceptances of the transportation request;
   identifying a selected trusted transportation provider, from the one or more acceptances of the transportation request by the one or more trusted provider computing devices; and
   communicating the identification as the selected trusted transportation provider, to a selected trusted transportation computing device associated with the selected trusted transportation provider,
   wherein the verifying of one or more trusted transportation providers comprises communicating with a third-party server verifying that email addresses associated with the one or more trusted transportation providers are authentic.

2. The computer-implemented method of claim 1, further comprising:
   determining a pickup time for the ride requester by the selected trusted transportation provider; and
   communicating the pickup time and the selected trusted transportation provider to the requester computing device.

3. The computer-implemented method of claim 2, further comprising:
   receiving, from the requester computing device, an acceptance of the selected trusted transportation provider and the pickup time; and
   communicating the acceptance of the selected trusted transportation provider and the pickup time to the selected trusted transportation provider computing device.

4. The computer-implemented method of claim 2, further comprising displaying a map of an area near a ride requester on a display of a ride requester's computing device; and
   wherein the pickup location or the destination location is selected via receiving an input of a location on the displayed map.

5. The computer-implemented method of claim 2, further comprising:
   retrieving one or more trusted transportation provider groups from a database server;
   communicating the one or more trusted transportation provider groups to the requester computing device to be shown on a display of the requester computing device.

6. The computer-implemented method of claim 1, wherein identifying the selected transportation provider comprises ranking the one or more trusted transportation providers who accepted the transportation request and selecting a highest ranked trusted transportation provider after the ranking process.

7. The computer-implemented method of claim 1, where the transportation request further including a selection of a trusted transportation group to receive the transportation request.

8. The computer-implemented method of claim 1, wherein the verifying of one or more trusted transportation providers comprises communicating with a third-party server verifying that a geographic location associated with the one or more trusted transportation providers are authentic or accurate.

9. The computer-implemented method of claim 1, wherein the verifying of one or more trusted transportation providers further comprises communicating with a third-party server verifying that the one or more trusted transportation providers do not have a criminal record.

10. A computer-implemented method for matching transportation providers with transportation requesters, comprising:
    receiving, from a requester computing device, a transportation request to transport a ride requester, the transportation request being for a trusted transportation provider and the transportation request including a requested pickup time, a pickup location and a destination location, the trusted transportation provider being an individual who has an established verified relationship with the ride requester;

before receiving the transportation request from the transportation requester, establishing the group of one or more trusted transportation providers through communication between the trusted transportation providers and verifying of the one or more trusted transportation providers, and wherein the one or more transportation providers comprises two or more trusted transportation providers retrieving computing device transmission parameters for one or more trusted transportation providers from a database on a computing device;

communicating, to one or more trusted provider computing devices, the transportation request based, at least in part, on the retrieved computing device transmission parameters;

receiving, from the one or more trusted provider computing devices, one or more acceptances of the transportation request;

identifying a selected trusted transportation provider, from the one or more acceptances of the transportation request by the one or more trusted provider computing devices; and communicating the identification as the selected trusted transportation provider, to a selected trusted transportation computing device associated with the selected trusted transportation provider, wherein the verifying of one or more trusted transportation providers comprises communicating with a third-party server verifying that the one or more trusted transportation providers have a valid license, a valid registration for an associated vehicle and/or valid insurance for the associated vehicle.

11. The computer-implemented method of claim 10, wherein the one or more trusted transportation providers are trusted parents of children at a school.

12. The computer-implemented method of claim 10, wherein the one or more trusted transportation providers are business associated with each other.

13. The computer-implemented method of claim 10, wherein the one or more trusted transportation providers are neighbors that live within a predefined radius of one another.

14. A computer-implemented method for matching transportation providers with transportation requesters, comprising:

receiving, from a requester computing device, a transportation request to transport a ride requester, the transportation request being for a trusted transportation provider and the transportation request including a requested pickup time, a pickup location and a destination location, the trusted transportation provider being an individual who has an established verified relationship with the ride requester;

before receiving the transportation request from the transportation requester, establishing the group of one or more trusted transportation providers through communication between the trusted transportation providers and verifying of the one or more trusted transportation providers, and wherein the one or more transportation providers comprises two or more trusted transportation providers retrieving computing device transmission parameters for one or more trusted transportation providers from a database on a computing device;

communicating, to one or more trusted provider computing devices, the transportation request based, at least in part, on the retrieved computing device transmission parameters;

receiving, from the one or more trusted provider computing devices, one or more acceptances of the transportation request;

identifying a selected trusted transportation provider, from the one or more acceptances of the transportation request by the one or more trusted provider computing devices; and communicating the identification as the selected trusted transportation provider, to a selected trusted transportation computing device associated with the selected trusted transportation provider, wherein the one or more trusted transportation providers to generate and communicate ratings of other one or more trusted transportation providers when the one or more trusted transportation provider is a transportation requester.

15. The computer-implemented method of claim 14, wherein the one or more trusted transportation providers to coordinate rides and/or schedule rides with one another.

16. The computer-implemented method of claim 14, wherein the transportation requesters to utilize selection criteria to identify a selected trusted transportation provider.

17. The computer-implemented method of claim 14, wherein the one or more trusted transportation providers can create trusted transportation provider groups which can be shared with only the created trusted transportation provider groups or that can be shared with remaining transportation providers.

* * * * *